United States Patent
Xu et al.

(10) Patent No.: US 11,963,034 B2
(45) Date of Patent: Apr. 16, 2024

(54) COMMUNICATION METHOD AND APPARATUS

(71) Applicant: HUAWEI TECHNOLOGIES CO., LTD., Shenzhen (CN)

(72) Inventors: Yixu Xu, Shanghai (CN); Yan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 17/477,608

(22) Filed: Sep. 17, 2021

(65) Prior Publication Data

US 2022/0007229 A1    Jan. 6, 2022

Related U.S. Application Data

(63) Continuation of application No. PCT/CN2020/080452, filed on Mar. 20, 2020.

(30) Foreign Application Priority Data

Mar. 20, 2019    (CN) .......................... 201910211776.0

(51) Int. Cl.
*H04W 28/02* (2009.01)
*H04L 47/30* (2022.01)
*H04W 28/06* (2009.01)

(52) U.S. Cl.
CPC ......... *H04W 28/0278* (2013.01); *H04L 47/30* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 9,674,318 B2 * | 6/2017 | Pope | H04L 69/22 |
| 10,164,889 B1 * | 12/2018 | Li | H04L 47/225 |
| 10,873,613 B2 * | 12/2020 | Pope | H04L 69/161 |
| 10,990,447 B1 * | 4/2021 | Shpiner | H04L 63/10 |

(Continued)

FOREIGN PATENT DOCUMENTS

| | | | |
|---|---|---|---|
| CN | 102447582 A | 5/2012 |
| CN | 103686853 A | 3/2014 |

(Continued)

OTHER PUBLICATIONS

ZTE, Discussion on flow control in IAB. 3GPP TSG RAN WG3 Meeting #103, Athens, Greece, Feb. 25-Mar. 1, 2019, R3-190503, 5 pages.

(Continued)

*Primary Examiner* — Gregory B Sefcheck
(74) *Attorney, Agent, or Firm* — Rimon PC

(57) ABSTRACT

This application provides a communication method and apparatus. In the method, a first network element creates a buffer queue based on a request of a second network element. Further, the first network element collects data of a corresponding type, sends data in the buffer queue to the second network element, and releases corresponding storage space after the second network element completes a data collection task. In this way, utilization of storage space of the first network element is improved, thereby solving the problem in the conventional technology that the first network element needs to have relatively large storage space capacity.

13 Claims, 8 Drawing Sheets

(56) References Cited

U.S. PATENT DOCUMENTS

| | | | |
|---|---|---|---|
| 2006/0153078 A1* | 7/2006 | Yasui | G06F 13/385 |
| | | | 370/235 |
| 2011/0227757 A1* | 9/2011 | Chen | G08G 1/096791 |
| | | | 340/902 |
| 2014/0068023 A1* | 3/2014 | Arickan | H04L 61/5014 |
| | | | 709/220 |
| 2014/0195480 A1* | 7/2014 | Talagala | G06F 16/2365 |
| | | | 707/610 |
| 2015/0023167 A1* | 1/2015 | Tong | H04L 47/12 |
| | | | 370/230 |
| 2015/0065186 A1* | 3/2015 | Mohd Mohdi | H04W 4/10 |
| | | | 455/518 |
| 2016/0344834 A1* | 11/2016 | Das | H04L 67/1097 |
| 2017/0034268 A1* | 2/2017 | Govind | H04L 67/1008 |
| 2017/0367002 A1* | 12/2017 | Rubin | G08C 15/00 |
| 2017/0371558 A1* | 12/2017 | George | G06F 3/067 |
| 2019/0394138 A1* | 12/2019 | Raisch | H04L 67/568 |

FOREIGN PATENT DOCUMENTS

| | | |
|---|---|---|
| CN | 108121596 A | 6/2018 |
| CN | 109358805 A | 2/2019 |
| WO | 2016163998 A1 | 10/2016 |
| WO | 2017089473 A1 | 6/2017 |
| WO | 2018087034 A1 | 5/2018 |

OTHER PUBLICATIONS

Talpey J Pinkerton Microsoft T:"" RDMA Durable Write Commit draft-talpey-rdma-commit 00 txt ,Feb. 20, 2016 , pp. 1-24, XP015111304.

* cited by examiner

COMMUNICATION METHOD AND APPARATUS

CROSS-REFERENCE TO RELATED APPLICATIONS

This application is a continuation of International Application No. PCT/CN2020/080452, filed on Mar. 20, 2020, which claims priority to Chinese Patent Application No. 201910211776.0, filed on Mar. 20, 2019. The disclosures of the aforementioned applications are hereby incorporated by reference in their entireties.

TECHNICAL FIELD

This application relates to the field of mobile communication technologies, and in particular, to a communication method and apparatus.

BACKGROUND

In a conventional technology, after collecting data, a producer usually relies on a large amount of local storage resources. For example, the producer stores data by using a large-capacity hard disk. Then, when a consumer needs data, the producer obtains corresponding data from the storage resources and sends the data to the consumer. Therefore, in the conventional technology, there is a relatively high requirement on the local storage resources of the producer.

However, in some scenarios, the local storage resources of the producer are relatively limited, and can hardly meet a requirement for storing a large amount of data. For example, in an architecture in which a centralized unit (CU) and a distributed unit (DU) are split, resources of the DU are limited, and no hard disk is disposed in the DU in an actual network form. When a physical layer (PHY) function and a medium access control (MAC) layer function are deployed in the DU, these layer functions generate a large amount of radio resource management (RRM) data and radio transmission technology (RTT) data. However, that the storage resources of the DU are limited causes a failure of a method for locally buffering large-scale data based on the conventional technology.

SUMMARY

This application provides a communication method and apparatus, to resolve a problem that data collection and reporting are affected when storage resources of a producer are limited.

According to a first aspect, this application provides a communication method, and the method includes: A first network element receives a request message of a second network element, where the request message includes one or more to-be-collected data types and one or more sizes of one or more requested buffer queues, the one or more data types include a first type, the sizes of the one or more requested buffer queues include a size of a requested first buffer queue, and the first buffer queue corresponds to the first type; and the first network element determines an actual size of the first buffer queue based on at least one of the sizes of the one or more requested buffer queues, where the actual size of the first buffer queue is less than or equal to the size of the requested first buffer queue. Based on this solution, the first network element creates a buffer queue based on a request of the second network element. Further, the first network element collects data of a corresponding type, and sends data in the buffer queue to the second network element. In this way, utilization of storage space of the first network element is improved, thereby resolving a problem in a conventional technology that the first network element needs to have a capability of relatively large storage space.

In a possible implementation method, that the first network element determines an actual size of the first buffer queue based on at least one of the sizes of the one or more requested buffer queues includes: The first network element determines the actual size of the first buffer queue based on space of free storage of the first network element and the at least one of the sizes of the one or more requested buffer queues.

In a possible implementation method, that the first network element determines the actual size of the first buffer queue based on space of free storage of the first network element and the at least one of the sizes of the one or more requested buffer queues includes: The first network element may determine the actual size of the first buffer queue based on the size of the requested first buffer queue and the space of free storage of the first network element.

In a possible implementation method, the first network element may further send a response message for the request message to the second network element, where the response message includes an identifier of the first buffer queue and the actual size of the first buffer queue. In this way, the second network element may learn which buffer queues are created by the first network element and learn actual sizes of the buffer queues. Further, the second network element may obtain the space of free storage of the first network element through updating and calculation, so that when data of another type needs to be collected from the first network element subsequently, the size of the requested buffer queue can be correctly calculated.

In a possible implementation method, the first network element collects data of the first type and buffers the data in the first buffer queue. The first network element sends a data feedback message to the second network element when data buffered in the first buffer queue meets a sending condition, where the data feedback message includes the data buffered in the first buffer queue, the first type, and the identifier of the first buffer queue.

In a possible implementation method, after the first network element sends the data feedback message to the second network element, the first network element backs up the data buffered in the first buffer queue to a first backup queue, and clears the first buffer queue, where the first backup queue is used to back up the data buffered in the first buffer queue. In this way, after sending the data in the first buffer queue, if it is determined that the second network element does not receive the data, the first network element may further re-obtain the data from the first backup queue and resend the data to the second network element. This helps improve a success rate of data sending and receiving, and further improves communication quality.

In a possible implementation method, the first network element continues to collect data of the first type and buffers the data in the first buffer queue, and after sending the data buffered in the first buffer queue to the second network element, if the first backup queue is full, the first network element deletes a part or all of data backed up in the first backup queue. The first network element backs up, to the first backup queue, the data buffered in the first buffer queue and clears the first buffer queue.

In a possible implementation method, the request message further includes a reliability level, and the reliability level is positively correlated with an actual size of the first backup queue. In this way, a backup level of data may be specified by using the reliability level. For example, a relatively high reliability level may be specified for important or high-priority data.

In a possible implementation method, the first network element updates the reliability level based on the space of free storage of the first network element. The first network element determines the actual size of the first backup queue based on an updated reliability level. The first network element sends the updated reliability level to the second network element. In this way, the first network element may update the reliability level based on the space of free storage, and this helps the first network element properly use storage space, thereby improving flexibility.

In a possible implementation method, after the first network element sends the data feedback message to the second network element, the first network element starts a timer. The first network element sends backup data to the second network element when determining that a response message sent by the second network element for the data feedback message is not received before the timer expires, and determining that the backup data of the data in the data feedback message is stored in the first backup queue.

In another possible implementation method, after the first network element sends the data feedback message to the second network element, the first network element starts a timer. The first network element stops the timer and deletes backup data that is stored in the first backup queue and that is backed up for the data in the data feedback message when determining that a response message sent by the second network element for the data feedback message is received before the timer expires. That is, the backup data of the data in the data feedback message is deleted, and the backup data is stored in the first backup queue.

In another possible implementation method, after the first network element sends the data feedback message to the second network element, the first network element start a timer. The first network element stops the timer when determining that a response message sent by the second network element for the data feedback message is not received before the timer expires, and determining that backup data of the data in the data feedback message is not stored in the first backup queue.

In a possible implementation method, the first network element sends indication information to the second network element, where the indication information includes the first type, the identifier of the first buffer queue, and a sending sequence number corresponding to the data buffered in the first buffer queue, and the indication information is used to indicate that the data that corresponds to the sending sequence number and that is in the first buffer queue is lost. In this way, correctness and integrity of data storage in the second network element are ensured.

In a possible implementation method, the timer is carried in the request message or set by the first network element.

In a possible implementation method, the data feedback message further includes one or more of the following information: a quantity of pieces of the data buffered in the first buffer queue, the sending sequence number corresponding to the data buffered in the first buffer queue, and collection time corresponding to the data buffered in the first buffer queue.

In a possible implementation method, that the sending condition is met means that the first buffer queue is full.

In a possible implementation method, the first network element receives a queue deletion message from the second network element, where the deletion message includes the identifier of the first buffer queue, and the deletion message is used to request to delete the first buffer queue. In this way, the first network element can delete a buffer queue that is no longer used in a timely manner, thereby improving storage space usage efficiency.

In a possible implementation method, the deletion message further includes an identifier of the first backup queue, and the deletion message is further used to request to delete the first backup queue. In this way, the first network element can delete a backup queue that is no longer used in a timely manner, thereby improving storage space usage efficiency.

In a possible implementation method, the first network element deletes the first buffer queue. The first network element sends, to the second network element, storage space released after the first buffer queue is deleted.

In a possible implementation method, the first network element deletes the first backup queue. The first network element sends, to the second network element, storage space released after the first backup queue is deleted.

In a possible implementation method, the first network element determines that the first network element has a capability of collecting data of the first type.

In a possible implementation method, the first network element determines that the space of free storage of the first network element changes. The first network element adjusts the actual size of the first buffer queue based on changed space of free storage of the first network element. The first network element sends an adjusted actual size of the first buffer queue to the second network element. In this way, the first network element may dynamically adjust an actual size of a buffer queue, thereby improving storage space usage efficiency.

In a possible implementation method, the first network element is a distributed unit, and the second network element is a centralized unit; the first network element is a core network element, and the second network element is a data analysis network element; or the first network element is a distributed unit, and the second network element is an operations support system.

According to a second aspect, this application provides a communication method, and the method includes: A second network element sends a request message to a first network element, where the request message includes one or more to-be-collected data types and one or more sizes of one or more requested buffer queues, the one or more data types include a first type, the sizes of the one or more requested buffer queues include a size of a requested first buffer queue, and the first buffer queue corresponds to the first type; and the second network element receives a response message sent by the first network element for the request message, where the response message includes an identifier of the first buffer queue and an actual size of the first buffer queue, the actual size of the first buffer queue is determined based on at least one of the sizes of the one or more requested buffer queues, and the actual size of the first queue is less than or equal to the size of the requested first buffer queue. Based on this solution, the first network element creates a buffer queue based on a request of the second network element. Further, the first network element collects data of a corresponding type, and sends data in the buffer queue to the second network element. In this way, utilization of storage space of the first network element is improved, thereby resolving a problem in a conventional technology that the first network element needs to have a capability of relatively large storage space.

In a possible implementation method, the second network element receives a data feedback message from the first network element, where the data feedback message includes data buffered in the first buffer queue, the first type, and the identifier of the first buffer queue.

In a possible implementation method, the request message further includes a reliability level, and the reliability level is positively correlated with an actual size of a first backup queue. In this way, a backup level of data may be specified by using the reliability level. For example, a relatively high reliability level may be specified for important or high-priority data.

In a possible implementation method, the second network element receives an updated reliability level from the first network element. In this way, the first network element may update the reliability level based on the space of free storage, and this helps the first network element properly use storage space, thereby improving flexibility.

In a possible implementation method, the second network element receives backup data in the first backup queue from the first network element.

In a possible implementation method, the request message further includes a timer, and the timer is configured to determine time for sending the backup data in the first backup queue.

In a possible implementation method, the second network element receives indication information from the first network element, where the indication information includes the first type, the identifier of the first buffer queue, and a sending sequence number corresponding to the data buffered in the first buffer queue, and the indication information is used to indicate that the data that corresponds to the sending sequence number and that is in the first buffer queue is lost. In this way, correctness and integrity of data storage in the second network element are ensured.

In a possible implementation method, the second network element deletes the data that corresponds to the sending sequence number and that is in data of another type associated with the first type.

In a possible implementation method, the data feedback message further includes one or more of the following information: a quantity of pieces of data buffered in the first buffer queue, the sending sequence number corresponding to the data buffered in the first buffer queue, and collection time corresponding to the data buffered in the first buffer queue.

In a possible implementation method, the second network element sends a queue deletion message to the first network element, where the deletion message includes the identifier of the first buffer queue, and the deletion message is used to request to delete the first buffer queue. In this way, the first network element can delete a buffer queue that is no longer used in a timely manner, thereby improving storage space usage efficiency.

In a possible implementation method, the deletion message further includes an identifier of the first backup queue, and the deletion message is further used to request to delete the first backup queue. In this way, the first network element can delete a backup queue that is no longer used in a timely manner, thereby improving storage space usage efficiency.

In a possible implementation method, the second network element receives, from the first network element, storage space released after first buffer queue is deleted. In this way, the second network element may obtain space of currently free storage of the first network element through calculation, so that when data of another type needs to be collected from the first network element subsequently, the second network element can correctly determine the size of the requested buffer queue. This helps improve communication efficiency.

In a possible implementation method, the first network element is a distributed unit, and the second network element is a centralized unit; the first network element is a core network element, and the second network element is a data analysis network element; or the first network element is a distributed unit, and the second network element is an operations support system.

According to a third aspect, this application provides a communication apparatus, and the apparatus has a function of implementing the communication method according to any one of the foregoing aspects or the implementation methods of the foregoing aspects. The function may be implemented by hardware, or may be implemented by hardware by executing corresponding software. The hardware or the software includes one or more modules corresponding to the foregoing function.

According to a fourth aspect, this application provides a communication apparatus, including a processor and a memory, where the memory is configured to store computer-executable instructions; and when the apparatus runs, the processor executes the computer-executable instructions stored in the memory, to enable the apparatus to perform the communication method according to any one of the foregoing aspects or the implementation methods of the foregoing aspects.

According to a fifth aspect, this application provides a communication apparatus, including units or means configured to perform the steps in any one of the foregoing aspects.

According to a sixth aspect, this application provides a communication apparatus, including a processor and an interface circuit, where the processor is configured to: communicate with another apparatus through the interface circuit, and perform any method according to any one of the foregoing aspects. There are one or more processors.

According to a seventh aspect, this application provides a communication apparatus, including a processor, configured to: be connected to a memory; and invoke a program stored in the memory, to perform the method according to any implementation of the foregoing aspects. The memory may be located inside the apparatus, or may be located outside the apparatus. In addition, there are one or more processors.

According to an eighth aspect, this application further provides a computer-readable storage medium. The computer-readable storage medium stores instructions; and when the instructions are run on a computer, a processor is enabled to perform the method according to any one of the foregoing aspects.

According to a ninth aspect, this application further provides a computer program product including instructions. When the computer program product runs on a computer, the computer is enabled to perform the method according to any one of the foregoing aspects.

According to a tenth aspect, this application further provides a chip system, including a processor, configured to perform the method according to the foregoing aspects.

According to an eleventh aspect, this application further provides a communication system, including a first network element configured to perform the method according to any one of the first aspect or the implementation methods of the first aspect, and a second network element configured to perform the method according to any one of the second aspect or the implementation methods of the second aspect.

DESCRIPTION OF EMBODIMENTS

To make objectives, technical solutions, and advantages of this application clearer, the following further describes this application in detail with reference to the accompanying drawings. A specific operation method in method embodiments may also be used in an apparatus embodiment or a system embodiment. In the descriptions of this application, unless otherwise stated, "a plurality of" means two or more than two.

Figure 1A:
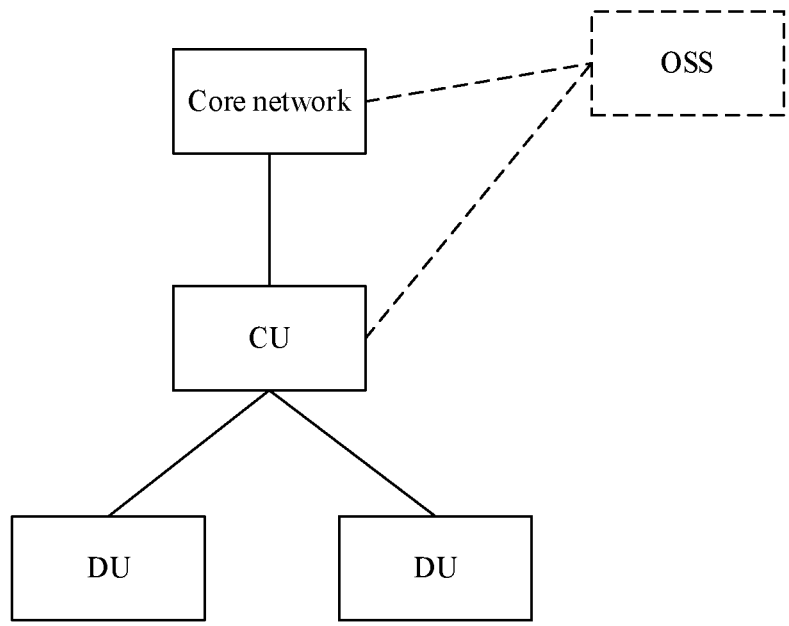
FIG. 1a is a schematic diagram of a 5G network architecture.

FIG. 1a is a schematic diagram of a 5th generation (5G) network architecture. The architecture includes a core network, a CU, and a DU. Optionally, the architecture further includes an operations support system (OSS).

In an existing network device form, a radio access network (RAN) logical network element is implemented by a remote radio unit (RRU) and a baseband control unit (BBU). Usually, the BBU has a strong storage expansion capability. Therefore, the BBU may buffer a large amount of data of operation and measurement types such as a call history record (CHR) and a measurement report (MR) that are collected on a RAN device. The OSS may obtain, based on a requirement, the data through a management plane interface between the OSS and the RAN device, and use the data.

In 5G, a BBU function is reconstructed into two units (or function entities): a CU and a DU. Functions of the CU and the DU are distinguished based on real-time processing of content. The CU mainly includes a non-real-time wireless upper-layer protocol stack function, and further supports some core network functions in being deployed and supports deployment of an edge application service. The DU mainly processes a physical layer function and a Layer 2 (L2) function having a real-time requirement. After the CU-DU architecture is used, the CU and the DU may be implemented by independent hardware. In terms of functions, some core network functions can be moved down to the CU or even the DU to implement mobile edge computing. In addition, all original L1 (physical layer)/L2 (data link layer)/L3 (network layer) functions are implemented in the BBU. In the new architecture, L1/L2/L3 functions can be split, and are implemented in the CU, the DU, or even the RRU, so as to flexibly cope with changes in transmission and service requirements. For example, in a specific example, non-real-time functions of L3 and L2 may be implemented in the CU, real-time functions of L2 and some functions of L1 are implemented in the DU, and other radio frequency functions of L1 are implemented in the RRU.

Figure 1B:
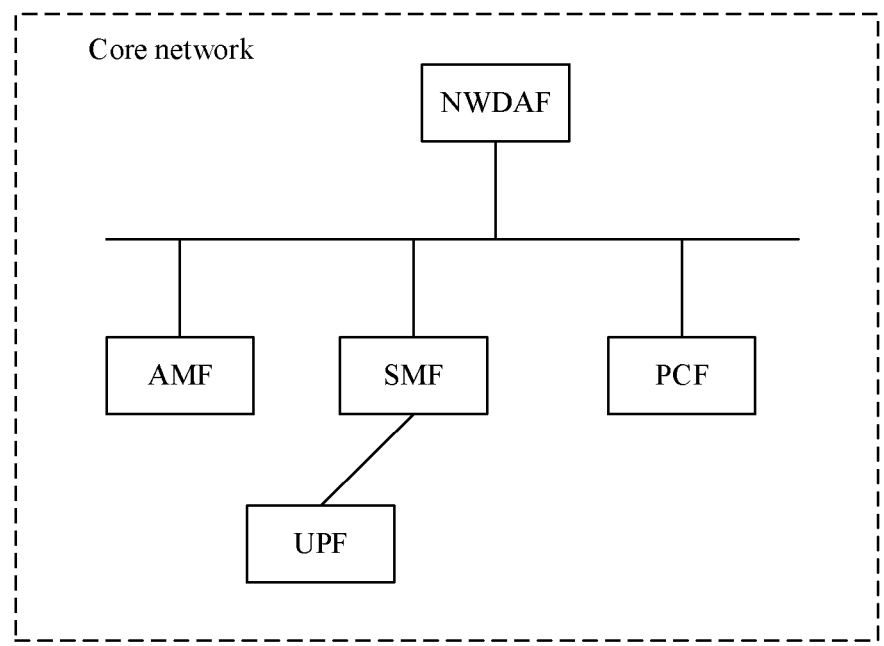
FIG. 1b is a schematic diagram of a 5G core network architecture.

FIG. 1b is a schematic diagram of a 5G core network architecture. The figure shows some function network elements in a core network. The function network elements include an access and mobility management function (AMF) network element, a session management function (SMF) network element, a user plane function (a UPF) network element, a policy control function (PCF) network element, and a network data analytics function (NWDAF) network element. Certainly, the core network may further include another function network element. For details, refer to related descriptions in the 5G standard.

The AMF network element is a control plane network element provided by an operator network, and is mainly responsible for access control and mobility management for accessing the operator network by a terminal device, for example, including functions such as mobility status management, temporary user identity assignment, and user authentication and authorization.

The SMF network element is a control plane network element provided by the operator network, and is responsible for managing a protocol data unit (PDU) session of the terminal device. The PDU session is a channel used to transmit a PDU, and the terminal device needs to transmit the PDU to a data network (DN) via the PDU session. The SMF network element is responsible for establishment, maintenance, deletion, and the like of the PDU session. The SMF network element includes functions related to a session, for example, session management (for example, session establishment, modification, and release, including tunnel maintenance between the UPF and the RAN), selection and control of the UPF network element, service and session continuity (SSC) mode selection, and roaming.

The UPF network element is a gateway provided by an operator, and is a gateway for communication between the operator network and the DN. The UPF network element includes functions related to a user plane, for example, packet routing and transmission, packet detection, service usage reporting, quality of service (QoS) processing, lawful interception, uplink packet detection, and downlink packet storage.

The PCF network element is a control plane function provided by the operator, and is configured to provide a policy of the PDU session for the SMF network element. The policy may include a charging-related policy, a QoS-related policy, an authorization-related policy, and the like.

The NWDAF network element can collect data from a network function (NF) network element (for example, the AMF network element, the SMF network element, or the UPF network element), and perform data analysis on the collected data to obtain a data analysis result. The NWDAF network element may further send the obtained data analytics result to the foregoing network function network elements, so that these network elements perform corresponding policy formulation, operation execution, and the like. In an implementation method, a first network element in this application may be the DU shown in FIG. 1a, and a second network element may be the CU shown in FIG. 1a. In another implementation method, the first network element in this application may be the DU shown in FIG. 1a, and the second network element may be the OSS shown in FIG. 1a. In another implementation method, the first network element may be the core network element (for example, the SMF network element, the UPF network element, the AMF network element, or the PCF network element) shown in FIG. 1a or FIG. 1b, and the second network element in this application may be the NWDAF network element shown in FIG. 1b.

It may be understood that the foregoing network elements or functions may be network elements in a hardware device, software functions running on dedicated hardware, or virtualized functions instantiated on a platform (for example, a cloud platform). The foregoing network architecture applicable to embodiments of this application is merely an example, and a network architecture applicable to the embodiments of this application is not limited thereto. Any network architecture that can implement functions of the foregoing network elements is applicable to the embodiments of this application.

In this application, the first network element may collect data of one or more types and send the data to the second network element. For example, when the first network element is the DU, and the second network element is the CU, data collected and reported by the first network element may include a reference signal received power (RSRP), a channel quality indicator (CQI), a modulation and coding scheme (MCS), and the like. For another example, when the first network element is the UPF network element, and the second network element is the NWDAF network element, data collected and reported by the first network element may include a packet size, a packet interval, a latency, jitter, and the like.

The first network element in this application is a network element that generates data, and therefore, the first network element may also be referred to as a producer. The second network element is a network element that uses data, and therefore, the second network element may also be referred to as a consumer.

It should be noted that, in this application, storage space of the first network element may be storage space of a storage medium of a type such as a memory, a secure digital card (SD Card), or a disk. A unified description is provided herein, and details are not described subsequently.

Figure 2A:
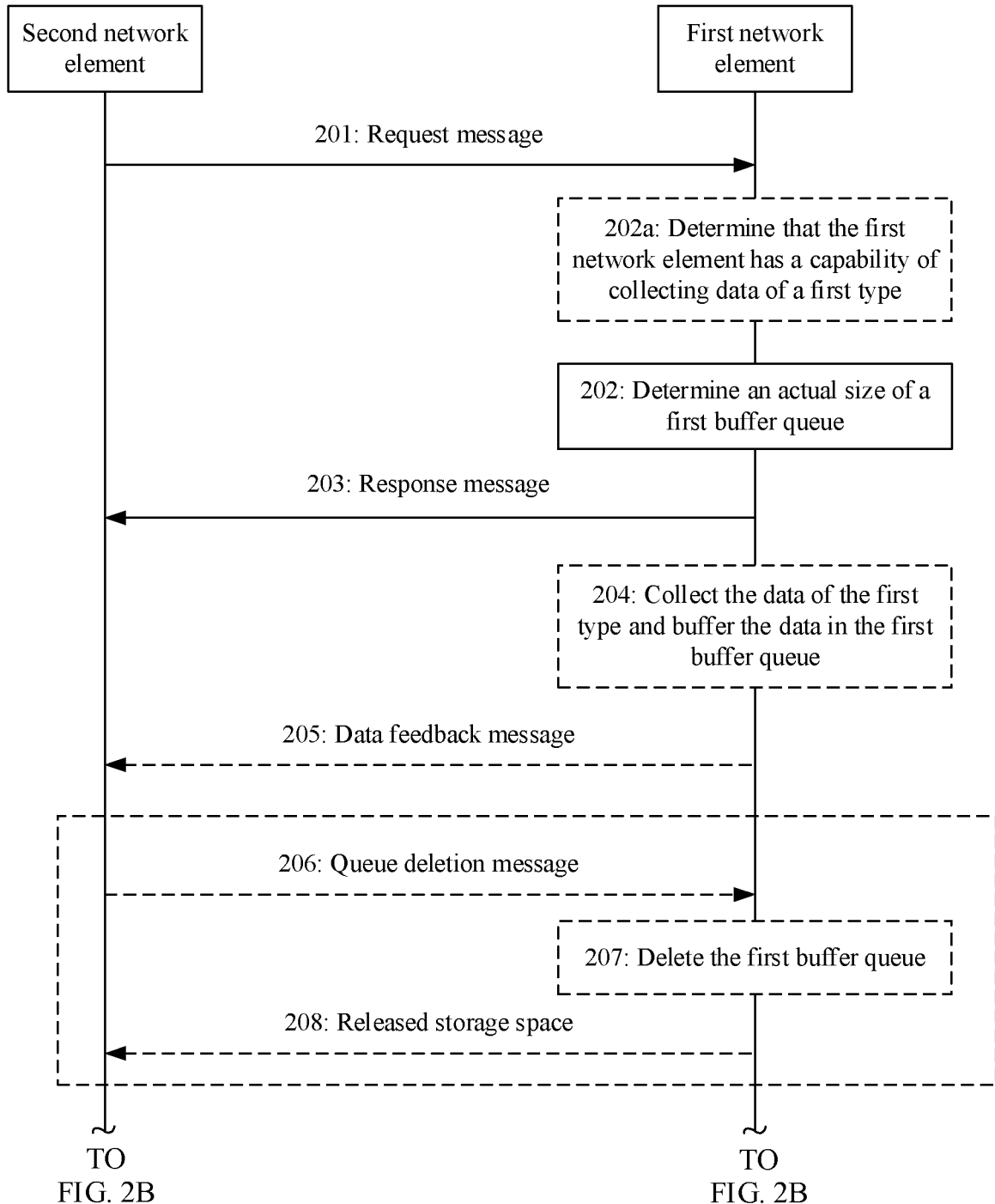
FIG. 2A and FIG. 2B are a schematic flowchart of a communication method according to this application.
Figure 2B:
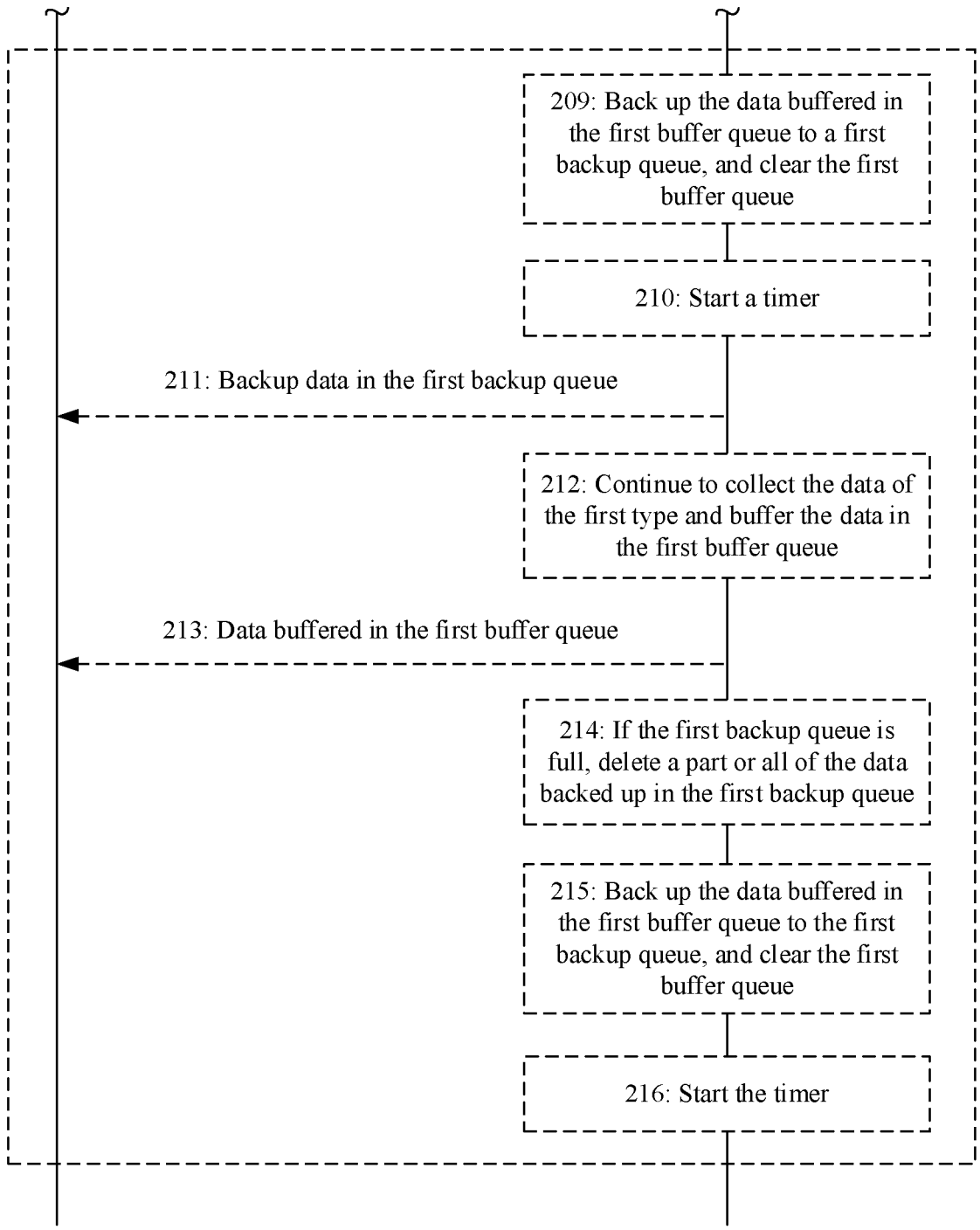

To resolve the problem mentioned in the background, based on the architecture shown in FIG. 1a or FIG. 1b, as shown in FIG. 2A and FIG. 2B, this application provides a communication method. The method includes the following steps.

Step 201: A second network element sends a request message to a first network element. Correspondingly, the first network element may receive the request message.

The request message includes one or more to-be-collected data types and one or more sizes of one or more requested buffer queues, the one or more data types include a first type, the sizes of the one or more requested buffer queues include a size of a requested first buffer queue, and the first buffer queue corresponds to the first type.

For example, if the second network element needs to collect data of N (N is a positive integer) data types, the N data types and sizes of M (M is a positive integer) requested buffer queues may be carried in the request message. The N data types herein include the first type, and the sizes of the M requested buffer queues include the size of the first buffer queue.

In an implementation, one buffer queue corresponds to one data type, that is, N=M.

In another implementation, one data type may correspond to a plurality of buffer queues.

In another implementation, one buffer queue may correspond to a plurality of data types.

For ease of description, in this application, an example in which one buffer queue corresponds to one data type is used for description subsequently.

In this application, a size of a requested buffer queue may be represented by storage space or a maximum quantity of samples that can be stored in the buffer queue. The following provides descriptions with reference to specific examples.

For example, N=3 and M=3, and the request message carries: (the first type, 10 megabytes (M)), (a second type, 20 M), and (a third type, 30 M). To be specific, the second network element requests to obtain data of the first type, data of the second type, and data of the third type from the first network element. In addition, storage space of a requested buffer queue (referred to as the first buffer queue) corresponding to the first type is 100 M, storage space of a requested buffer queue (referred to as a second buffer queue) corresponding to the second type is 200 M, and storage space of a requested buffer queue (referred to as a third buffer queue) corresponding to the third type is 300 M.

For another example, N=3 and M=3, and the request message carries: (the first type, 20), (a second type, 25), and (a third type, 30). To be specific, the second network element requests to obtain data of the first type, data of the second type, and data of the third type from the first network element. In addition, a size of a requested buffer queue (referred to as the first buffer queue) corresponding to the first type is a size of 20 samples, a size of a requested buffer queue (referred to as a second buffer queue) corresponding to the second type is a size of 25 samples, and a size of a requested buffer queue (referred to as a third buffer queue) corresponding to the third type is a size of 30 samples. A size of each sample may be negotiated by the first network element and the second network element in advance, predefined in a protocol, or preconfigured by the second network element for the first network element.

Step 202: The first network element determines an actual size of the first buffer queue based on at least one of the sizes of the one or more requested buffer queues, where the actual size of the first buffer queue is less than or equal to the size of the requested first buffer queue.

After receiving the request message, the first network element determines the size of the first buffer queue and a size of another buffer queue based on a size of at least one buffer queue in the sizes that are of the one or more requested buffer queues and that are carried in the request message, and further creates the first buffer queue and the another buffer queue.

In an implementation method, the first network element may determine the actual size of the first buffer queue and an actual size of the another buffer queue based on space of free storage of the first network element and the at least one of the sizes of the one or more requested buffer queues. In this application, an actual size of a buffer queue may be represented by storage space, or may be represented by a stored sample size. This is not limited in this application. A general description is made here. Details are not described below.

The following describes the foregoing method for determining the actual size of the first buffer queue and the actual size of the another buffer queue with reference to different cases.

Case 1: The space of free storage of the first network element is greater than or equal to a sum of storage space corresponding to the sizes that are of the one or more requested buffer queues and that are carried in the request message.

In a first implementation method, because the space of free storage of the first network element is greater than or equal to the sum of the storage space corresponding to the sizes that are of the one or more requested buffer queues and that are carried in the request message, corresponding storage space may be allocated based on a size of each requested buffer queue. For example, content carried in the request message is shown in the foregoing example, that is, the request message carries: (the first type, 10 M), (the second type, 20 M), and (the third type, 30 M), and the space of free storage of the first network element is 200 M. Because 200 M>(10 M+20 M+30 M), the first network element determines that the actual size of the first buffer queue corresponding to the first type is 10 M, an actual size of the second buffer queue corresponding to the second type is 20 M, and an actual size of the third buffer queue corresponding to the third type is 30 M. The implementation method may also be understood as: The first network element determines the actual size of the first buffer queue based on the size of the requested first buffer queue and the space of free storage of the first network element; the first network element determines the actual size of the second buffer queue based on the size of the requested second buffer queue and the space of free storage of the first network element; the first network element determines the actual size of the third buffer queue based on the size of the requested third buffer queue and the space of free storage of the first network element; and so on.

In a second implementation method, in consideration that a backup queue may need to be created for the foregoing one or more buffer queues subsequently, the first network element may reserve a part of storage space in the space of free storage, and then allocate the storage space. For example, based on the foregoing example, the first network element may use 80 M of 200 M as reserved storage space (used to create a backup queue, or reserved for other use), and then determine an actual size of each buffer queue based on updated space (that is, 120 M) of free storage. In a case, if the updated space of free storage is still greater than or equal to the sum of the storage space corresponding to the sizes that are of the one or more requested buffer queues and that are carried in the request message, the actual size may be determined for each buffer queue based on the foregoing first implementation method. In another case, if the updated space of free storage is still less than the sum of the storage space corresponding to the sizes that are of the one or more requested buffer queues and that are carried in the request message, the actual size may be determined for each buffer queue by referring to the method described in the following case 2.

Case 2: The space of free storage of the first network element is less than a sum of storage space corresponding to the sizes that are of the one or more requested buffer queues and that are carried in the request message.

In a first implementation method, because the space of free storage of the first network element is less than the sum of the storage space corresponding to the sizes that are of the one or more requested buffer queues and that are carried in the request message, the first network element cannot allocate corresponding storage space based on a size of each requested buffer queue. For example, content carried in the request message is shown in the foregoing example, that is, the request message carries: (the first type, 10 M), (the second type, 20 M), and (the third type, 30 M), and the space of free storage of the first network element is 30 M.

For the first implementation method, in specific implementation, there may be the following several specific implementations.

Implementation 1: The first network element may determine an actual size for each requested buffer queue based on a proportion of a size of each requested buffer queue occupying sizes of requested buffer queues.

For the foregoing example, because 10 M/(10 M+20 M+30 M)=1/6, 20 M/(10 M+20 M+30 M)=1/3, and 30 M/(10 M+20 M+30 M)=1/2, the determined actual size of the first buffer queue is 30 M*1/6=5 M, the determined actual size of the second buffer queue is 30 M*1/3=10 M, and the determined actual size of the first buffer queue is 30 M*1/2=15 M.

Implementation 2: The first network element may determine an actual size of a buffer queue for each requested buffer queue based on a priority of each buffer queue.

For the foregoing example, assuming that a priority of the first buffer queue>a priority of the second buffer queue>a priority of the third buffer queue, the size of the requested first buffer queue may be met first, then the size of the requested second buffer queue is met, and finally the size of the requested third buffer queue is met. Therefore, the actual size that is of the first buffer queue and that is determined by the first network element is 10 M, the actual size that is of the second buffer queue and that is determined by the first network element is 20 M, and the actual size that is of the third buffer queue and that is determined by the first network element is 0 M.

In a priority-based manner, requirements of some sizes of buffer queues with relatively high priorities may also be met. For example, according to a preset method, the actual size that is of the first buffer queue and that is determined by the first network element is 10 M*80%=8 M, the actual size that is of the second buffer queue and that is determined by the first network element is 20 M*70%=14 M, and the actual size that is of the third buffer queue and that is determined by the first network element is 8 M (For example, the first network element first determines that the actual size of the third buffer queue is 30 M*60%=18 M. However, because 18 M>(30 M−8 M−14 M), the first network element re-determines that the actual size of the third buffer queue is 8 M (that is, 30 M−8 M−14 M=8 M)). 80%, 70%, and 60% herein are preset values.

In a second implementation method, in consideration that a backup queue may need to be created for the foregoing one or more buffer queues subsequently, the first network element may reserve a part of storage space in the space of free storage, and then allocate the storage space. For example, based on the foregoing example, the first network element may use 10 M of 30 M as reserved storage space (used to create a backup queue, or reserved for other use), and then determine an actual size of each buffer queue based on updated space (that is, 20 M) of free storage. Because the updated space of free storage is still less than the sum of the storage space corresponding to the sizes that are of the one or more requested buffer queues and that are carried in the request message, the actual size may be determined for each buffer queue by referring to the method described in the first implementation method in the case 2. Details are not described herein again.

The foregoing provides various possible implementation methods for determining, by the first network element, the actual size of the first buffer queue and the actual size of the another buffer queue. Certainly, in actual application, this application is not limited to the foregoing methods.

According to the foregoing methods, storage space may be allocated to each requested buffer queue, or storage space may be allocated to only some buffer queues and a part of storage space cannot be allocated to other buffer queues.

After actual sizes of the buffer queues are allocated to (or determined for) the one or more buffer queues, each buffer queue may be created based on the actual size of the buffer queue. It should be noted that for a buffer queue to which no storage space is allocated, the buffer queue is not created.

Optionally, after step 201 and before step 202, the method further includes the following step 202a.

Step 202a: The first network element determines that the first network element has a capability of collecting data of the first type.

To be specific, the first network element determines that a corresponding buffer queue (for example, the first buffer queue) needs to be created only when determining that the first network element has a capability of collecting data of a data type corresponding to a to-be-created buffer queue (for example, the first type corresponding to the first buffer queue). Otherwise, the corresponding buffer queue (for example, the first buffer queue) is not created.

Optionally, step 202a may alternatively be performed after step 202 and before step 203.

Step 203: The first network element sends a response message for the request message to the second network element. Correspondingly, the second network element may receive the response message.

The response message includes one or more identifiers and one or more actual sizes of the one or more created buffer queues. For example, if the one or more created buffer queues include the first buffer queue, the response message includes an identifier of the first buffer queue and an actual size of the first buffer queue, the actual size of the first buffer queue is determined based on at least one of the sizes of the one or more requested buffer queues, and the actual size of the first queue is less than or equal to the size of the requested first buffer queue.

Based on the foregoing solution, in this application, a data consumer (the second network element) sends a request for creating a data collection queue (namely, a buffer queue) to a data producer (the first network element), the data producer may flexibly allocate, with reference to an idle resource situation (that is, space of free storage) of the data producer, an actual size of the buffer queue when resources are limited, and create a lightweight data buffer queue. This implements an objective of flexibly allocating an actual size of a buffer queue on a resource-limited network device (that is, the first network element), and improves resource utilization of the network device. In addition, service data of various types can be collected in an on-demand customization manner on the resource-limited network device, and can be reported. This resolves a problem in the conventional technology that there is a relatively high requirement on local storage resources of the producer.

Further, in the foregoing solution, the first network element further feeds back an actual size of a created buffer queue to the second network element, so that the second network element can learn of an actual situation of the buffer queue created by the first network element, and obtain space of currently free storage in the first network element through analysis. In this way, when needing to collect data of another type from the first network element subsequently, the second network element can correctly calculate a size that is of another buffer queue and that can be requested from the first network element.

After creating the one or more buffer queues, the first network element may subsequently use the buffer queue to store collected data of one or more data types. The following uses the first buffer queue in the one or more created buffer queues as an example for description. If another buffer queue (such as the second buffer queue or the third buffer queue) is created, refer to the usage method of the first buffer queue.

Optionally, after step 203, the method may further include the following step 204 and step 205.

Step 204: The first network element collects data of the first type and buffers the data in the first buffer queue.

Step 205: The first network element sends a data feedback message to the second network element when data buffered in the first buffer queue meets a sending condition, where the data feedback message includes the data buffered in the first buffer queue, the first type, and the identifier of the first buffer queue.

In an implementation method, that the sending condition is met herein may mean that the first buffer queue is full. To be specific, when the first buffer queue is full of the data of the first type, the first network element is triggered to send the data feedback message to the second network element. In another implementation method, that the sending condition is met herein may alternatively be another trigger condition. For example, an amount of data, of the first type, buffered in the first buffer queue exceeds a preset proportion (for example, 80%) of storage of the first buffer queue. For another example, a sending periodicity of the first buffer queue may be reached, and the first buffer queue is not empty. The sending condition that is met is not specifically limited in this application, and may be determined according to an actual requirement.

The data feedback message may carry the data buffered in the first buffer queue (for example, the data may be sent in a form of a data block), the first type (that is, a data type of the data buffered in the first buffer queue), and the identifier of the first buffer queue.

Optionally, the data feedback message may further include one or more of the following information: a quantity of pieces of the data buffered in the first buffer queue, a sending sequence number corresponding to the data buffered in the first buffer queue (that is, each piece of sent data or each sent data block may be numbered to obtain a sending sequence number), and collection time (that is, timestamp information) corresponding to the data buffered in the first buffer queue.

Functions of the timestamp information and the sending sequence number that are uploaded in the data feedback message are as follows: When the second network element collects data of a plurality of types at the same time, and when the second network element writes the collected data of different types into a database, the second network element may associate the data of different types based on the uploaded timestamp information and sending sequence number. In addition, after data of a type is lost in a data transmission process, associated data of another type also needs to be deleted to ensure data consistency.

According to the foregoing step 204 and step 205, the first network element collects data and buffers the data in a corresponding buffer queue, and then sends the data in the buffer queue to the second network element subsequently. In this way, the first network element sends, to the second network element based on a request of the second network element, data that meets a requirement.

Optionally, after the second network element determines that a task of obtaining the data of the first type is completed, after step 205, the method may further include the following step 206 to step 208.

Step 206: The second network element sends a queue deletion message to the first network element. Correspondingly, the first network element may receive the queue deletion message.

The deletion message includes the identifier of the first buffer queue, and the deletion message is used to request to delete the first buffer queue.

Optionally, the deletion message may further include the first type. The first type is a data type of the data stored in the first queue.

In other words, after determining that the data of the first type no longer needs to be obtained, the second network element may request, by using the queue deletion message, the first network element to delete the first buffer queue.

Step 207: The first network element deletes the first buffer queue.

The first network element deletes the first buffer queue, including releasing storage space occupied by the first buffer queue. After deleting the first buffer queue, the first network element may recalculate space of free storage.

Step 208: The first network element sends, to the second network element, storage space released after the first buffer queue is deleted.

After receiving the storage space released after the first buffer queue is deleted, the second network element may recalculate space of currently free storage of the first network element, so that a size of a requested buffer queue can be calculated when data of another type needs to be obtained from the first network element subsequently.

According to the foregoing step 206 to step 208, when the second network element no longer needs to obtain the data of the first type, the second network element instructs the first network element to delete the corresponding buffer queue and reports the released storage space. In this way, when the second network element needs to obtain data of another type from the first network element subsequently, it is convenient to calculate the size of the requested buffer queue.

According to the foregoing step 201 to step 208, based on the request of the second network element, the first network element creates a buffer queue and collects data of a corresponding type, sends data in the buffer queue to the second network element, and releases corresponding storage space after the second network element completes a data collection task. In this way, utilization of storage space of the first network element is improved, thereby resolving a problem in a conventional technology that the first network element needs to have a capability of relatively large storage space.

Optionally, in the foregoing embodiment of step 201 to step 206, when the first network element determines that the space of free storage of the first network element changes (for example, some buffer queues are dynamically released to increase the space of free storage, a buffer queue is dynamically created to decrease the space of free storage, or the space of free storage is increased or decreased due to other reasons), the first network element may adjust the actual size of the first buffer queue and/or adjust a size of another buffer queue based on changed space of free storage of the first network element, and send an adjusted actual size of the first buffer queue and/or an adjusted size of the another buffer queue to the second network element. In this way, the storage space of the buffer queue can be dynamically adjusted, and the storage space of the first network element can be fully and properly used.

In actual application, the data feedback message in step 205 may not be sent to the second network element due to a reason (for example, a reason such as network congestion), or the second network element receives the data feedback message but cannot correctly parse the data feedback message (for example, some bits of the packet are lost). Consequently, the second network element does not actually obtain the data that is in the first buffer queue and that is sent by the first network element. For example, when the second network element is required to send a response message for the data feedback message to the first network element after determining that the data in the first buffer queue is received, the second network element does not send the response message for the data feedback message to the first network element when determining that the data in the first buffer queue is not received. In this way, the first network element may determine, based on whether the response message sent by the second network element for the data feedback message is received, whether the second network element receives the data in the first buffer queue.

To enable the first network element to resend the data to the second network element when determining that the second network element does not receive the data in the first buffer queue, after step 205, in this application, the following step 209 to step 214 may be further performed. It should be noted that in this case, step 206 to step 208 are not performed, or are performed at a time point after step 209 to step 214.

Step 209: The first network element backs up the data buffered in the first buffer queue to a first backup queue, and clears the first buffer queue, where the first backup queue is used to back up the data buffered in the first buffer queue.

In an implementation method, an actual size of the first backup queue may be set to be the same as the actual size of the first buffer queue.

In another implementation method, an actual size of the first backup queue may be further set according to a reliability level, and the reliability level herein is positively correlated with the actual size of the first backup queue. For example, if the reliability level is 1, the actual size of the first backup queue is equal to the actual size of the first buffer queue; if the reliability level is 2, the actual size of the first backup queue is twice the actual size of the first buffer queue; if the reliability level is 3, the actual size of the first backup queue is three times the actual size of the first buffer queue; and so on. Optionally, the request message in step 201 carries a reliability level corresponding to each buffer queue (for example, the first buffer queue corresponds to a reliability level 1, the second buffer queue corresponds to a reliability level 2, and so on), or the reliability level may be predefined in a protocol.

In specific implementation, a higher reliability level may be set for an important data type or a data type with a high priority, so as to create a backup queue with larger storage space. In this way, the data can be backed up for a longer period of time, and reliability of the data can be ensured.

Figure 3:
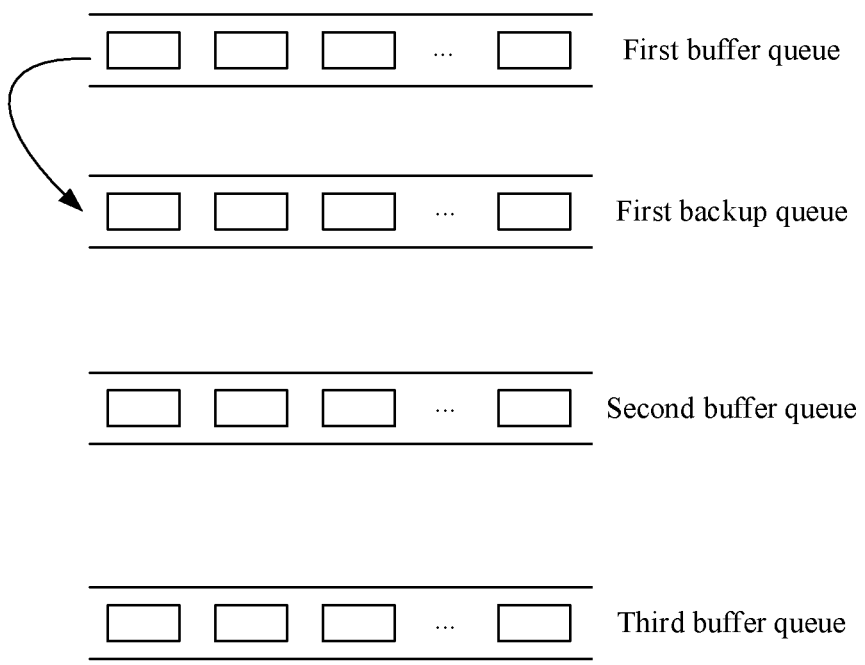
FIG. 3 is an example diagram of buffer queues and a backup queue according to this application.

The following describes a method for using a buffer queue and a backup queue in this application with reference to the accompanying drawings. FIG. 3 is an example diagram of buffer queues and a backup queue according to this application. A first network element creates a first buffer queue, a second buffer queue, and a third buffer queue. For the first buffer queue, a first backup queue is also created. Because the second buffer queue and the third buffer queue are not discussed herein, whether the second buffer queue and the third buffer queue have backup queues is not shown in the figure.

The following briefly describes a method for using the first buffer queue and the first backup queue. For a detailed description of the method, refer to subsequent descriptions of step 209 to step 216. In addition, assuming that a reliability level is equal to 2, an actual size of the first backup queue is twice an actual size of the first buffer queue.

First, the first network element collects data of a first type and buffers the data in the first buffer queue.

Second, when the first buffer queue meets a sending condition (for example, the sending condition is that the first buffer queue is full), the first network element sends the data in the first buffer queue to a second network element, backs up the data in the first buffer queue to the first backup queue, and clears the first buffer queue.

Third, the first network element continues to collect the data of the first type and buffers the data in the first buffer queue.

Fourth, when the first buffer queue meets a sending condition (for example, the sending condition is that the first buffer queue is full), the first network element sends the data in the first buffer queue to the second network element, backs up the data in the first buffer queue to the first backup queue, and clears the first buffer queue.

Because the actual size of the first backup queue is twice the actual size of the first buffer queue, there is still storage space for backing up the data in the first buffer queue.

Fifth, the first network element continues to collect the data of the first type and buffers the data in the first buffer queue.

Sixth, when the first buffer queue meets a sending condition (for example, the sending condition is that the first buffer queue is full), the first network element sends the data in the first buffer queue to the second network element, deletes a part of data in the first backup queue, backs up the data in the first buffer queue to the first backup queue, and clears the first buffer queue.

Because the first backup queue is full after the second backup, there is no storage space for backing up the data in the first buffer queue. Therefore, a part of data needs to be deleted before the backup. For example, a part of data that is backed up for a longest period of time may be deleted. In this way, a part of storage space is free, so as to back up new data in the first buffer queue.

The fifth and sixth operations are repeated.

It should be noted that the actual size of the first backup queue may affect time for which data in the first backup queue is backed up in the first backup queue. Specifically, a larger actual size of the first backup queue indicates a longer period of time for which the data in the first backup queue is backed up. The first backup queue has the following functions: When the first network element determines that the data in the first buffer queue is not received or correctly received by the second network element, the first network element may obtain corresponding data from the first backup queue for resending. In addition, a larger actual size of the first backup queue indicates a higher success rate of which the first network element can obtain corresponding backup data from the first backup queue.

Certainly, because a larger actual size of the first backup queue indicates more occupied storage space, the actual size of the first backup queue needs to be determined by considering the occupied storage space and a time length for which data is backed up. Optionally, the first network element may further update the reliability level based on space of free storage of the first network element. The first network element determines the actual size of the first backup queue based on an updated reliability level. Then, the first network element sends the updated reliability level to the second network element. For example, when determining that the space of free storage is sufficient or insufficient, the first network element may consider updating the reliability level, determine the actual size of the first backup queue based on an updated reliability level, and further need to report the updated reliability level to the second network element. In this way, the second network element may determine a size of a backup queue, and further calculate the space of free storage of the first network element.

Step 210: The first network element starts a timer.

The timer may be carried in the request message in step 201, set by the first network element, or predefined in a protocol. This is not limited in this application.

The timer is configured to determine time for sending backup data in the first backup queue. The following provides descriptions based on different cases.

Case 1: The first network element sends the backup data in the first backup queue to the second network element when determining that a response message sent by the second network element for the data feedback message is not received before the timer expires, and determining that the backup data of the data in the data feedback message is stored in the first backup queue.

The response message may carry a sending sequence number of data and an identifier of the first buffer queue, and optionally, may further include the first type. The response message is used to notify the first network element that the second network element has received the data that is of the sending sequence number and that is in the first buffer queue.

That is, in this case, the first network element may perform the following step 211.

Step 211: The first network element sends the backup data in the first backup queue to the second network element.

The backup data herein refers to backup data that is in the first backup queue and that is of the data in the first buffer queue mentioned in step 204 or step 205.

Based on this solution, when the data sent by the first network element to the second network element is not received or correctly received by the second network element, the first network element may resend the same data. In this way, a success rate of obtaining the data in the first network element by the second network element is improved, and data collection efficiency can be improved.

Case 2: The first network element stops the timer and deletes backup data that is stored in the first backup queue and that is backed up for the data in the data feedback message when determining that a response message sent by the second network element for the data feedback message is received before the timer expires.

For descriptions of content carried in the response message, refer to the descriptions of the response message in the foregoing case 1. Details are not described herein again.

That the timer is stopped and the backup data that is stored in the first backup queue and that is backed up for the data in the data feedback message is deleted means that the backup data of the data in the data feedback message is deleted, and the backup data is stored in the first backup queue.

In this case, before the timer expires, the first network element receives the response message sent by the second network element for the foregoing data feedback message. This indicates that the second network element receives the data that is sent by the first network element and that is in the first buffer queue mentioned in step 204 or step 205. Therefore, the first network element may stop the timer and delete the backup data that is stored in the first backup queue and that is of the data in the data feedback message. In this way, the first backup queue can be effectively used.

Case 3: The first network element stops the timer when determining that a response message sent by the second network element for the data feedback message is not received before the timer expires, and determining that backup data of the data in the data feedback message is not stored in the first backup queue.

For descriptions of content carried in the response message, refer to the descriptions of the response message in the foregoing case 1. Details are not described herein again.

In this case, before the timer expires, the first network element does not receive the response message sent by the second network element for the data feedback message. This indicates that the second network element does not receive the data that is sent by the first network element and that is in the first buffer queue mentioned in step 204 or step 205. In addition, because there is no backup data of the data that is in the first buffer queue in the first backup queue, the first network element cannot resend the same data. In this case, it indicates that the data is lost, and the second network element cannot receive the data. In this case, the first network element may stop the timer.

In the case 3, optionally, after stopping the timer, the first network element may further send indication information to the second network element, where the indication information includes the first type, the identifier of the first buffer queue, and the sending sequence number corresponding to the data buffered in the first buffer queue, and the indication information is used to indicate that the data that corresponds to the sending sequence number and that is in the first buffer queue is lost. That is, the first network element notifies the second network element that the data that corresponds to the sending sequence number and that is in the first buffer queue is lost.

Optionally, after receiving the indication information, the second network element may delete the data that corresponds to the sending sequence number and that is in data of another type associated with the first type. In this way, data integrity and data correctness are ensured. For example, data of the first type, data of a second type, and data of a third type in the first network element are three dimensions of one piece of data, and if the second network element determines, based on the indication information, that data that is of a sending sequence number 1 and that is of the first type is lost, the second network element may delete the data of the sending sequence number 1 from the data corresponding to the second type, and delete the data of the sending sequence number 1 from the data corresponding to the third type. In this way, data integrity and data correctness are ensured.

Optionally, after step 209, the method may further include the following step 212 to step 216. It should be noted that there is no strict execution sequence between the following step 212 to step 216 and the foregoing step 210 and step 211.

Step 212: The first network element continues to collect the data of the first type and buffers the data in the first buffer queue.

Step 213: The first network element sends the data buffered in the first buffer queue to the second network element.

Step 214: If the first backup queue is full, delete a part or all of the data backed up in the first backup queue.

Step 215: The first network element backs up the data buffered in the first buffer queue to the first backup queue, and clears the first buffer queue.

Step 216: Start the timer.

For subsequent steps after the timer is started, refer to related descriptions in step 210. Details are not described herein again.

It should be noted that step 212 to step 216 may be repeatedly performed.

Optionally, in the procedure from step 209 to step 216, when the second network element no longer needs to obtain the data of the first type, the second network element instructs the first network element to delete the corresponding buffer queue and the backup queue, and reports the released storage space. In this way, when the second network element needs to obtain data of another type from the first network element subsequently, a size of the requested buffer queue can be calculated. For example, in an implementation method, the following step A to step C may be performed after any step in the procedure from step 209 to step 216.

Step A: The second network element sends a queue deletion message to the first network element. Correspondingly, the first network element may receive the queue deletion message.

The deletion message includes the identifier of the first buffer queue and an identifier of the first backup queue, and the deletion message is used to request to delete the first buffer queue and the first backup queue.

In other words, after determining that the data of the first type no longer needs to be obtained, the second network element may request, by using the queue deletion message, the first network element to delete the first buffer queue and the first backup queue.

Step B: The first network element deletes the first buffer queue and the first backup queue.

The first network element deletes the first buffer queue and the first backup queue, including releasing storage space occupied by the first buffer queue and the first backup queue. After deleting the first buffer queue and the first backup queue, the first network element may recalculate space of free storage.

Step C: The first network element sends, to the second network element, storage space released after the first buffer queue is deleted.

After receiving the storage space released after the first buffer queue and the first backup queue are deleted, the second network element may recalculate the space of currently free storage of the first network element, so that a size of a requested buffer queue can be calculated when data of another type needs to be obtained from the first network element subsequently.

According to the foregoing step 201 to step 205 and step 209 to step 216, based on the request of the second network element, the first network element creates a buffer queue and collects data of a corresponding type, sends data in the buffer queue to the second network element, and may further release corresponding storage space after the second network element completes a data collection task. In this way, utilization of storage space of the first network element is improved, thereby resolving a problem in a conventional technology that the first network element needs to have a capability of relatively large storage space. In addition, a retransmission mechanism is further implemented, that is, data is retransmitted when the data fails to be sent. This helps improve a data transmission success rate, and further improves communication quality.

The embodiment shown in FIG. 2A and FIG. 2B is described in detail below with reference to specific embodiments. Both the following embodiment shown in FIG. 4a and the following embodiment shown in FIG. 4b are described by using an example in which the first network element is a DU and the second network element is a CU.

Figure 4A:
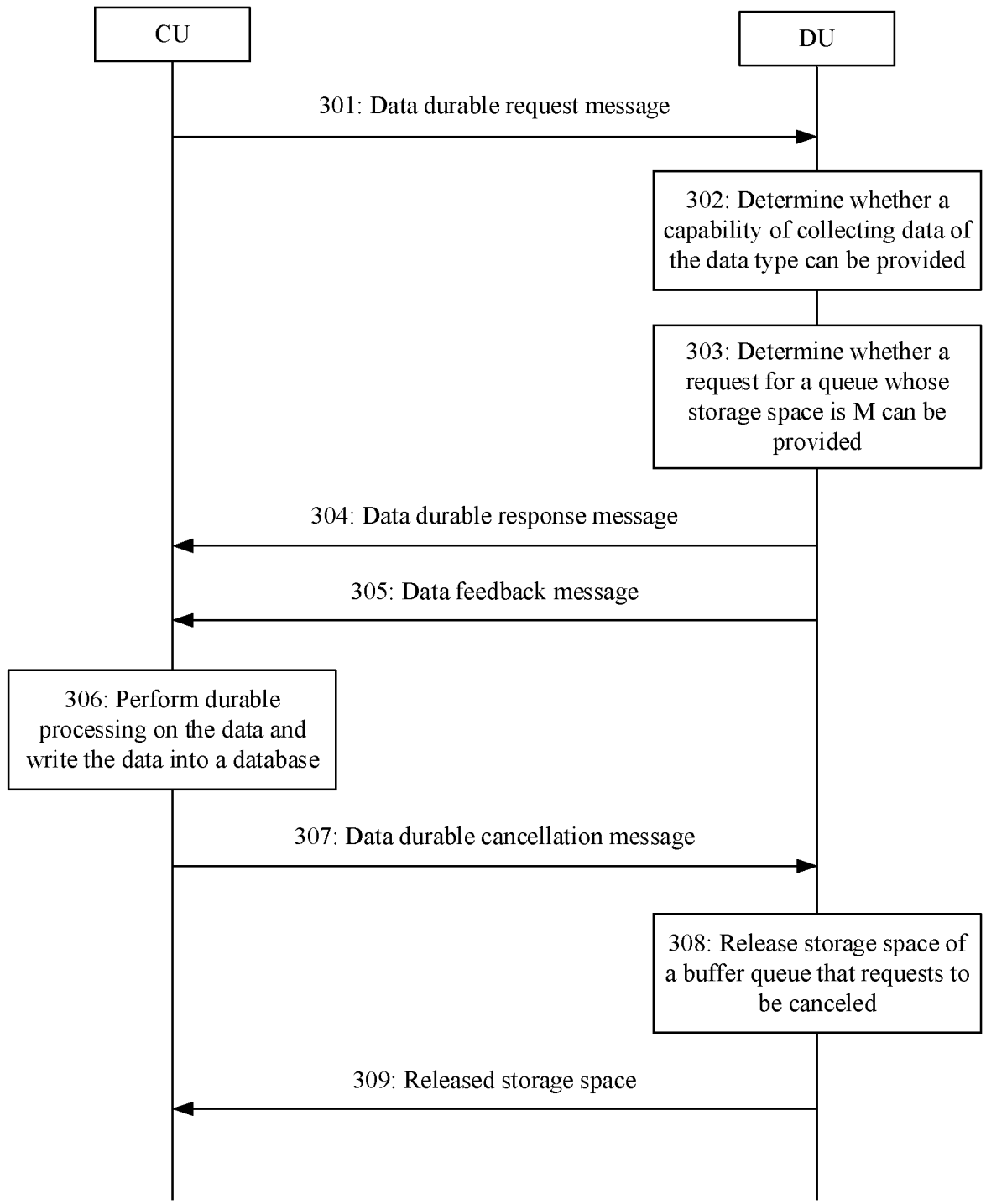
FIG. 4a is a schematic flowchart of a communication method according to this application.
Figure 4B:
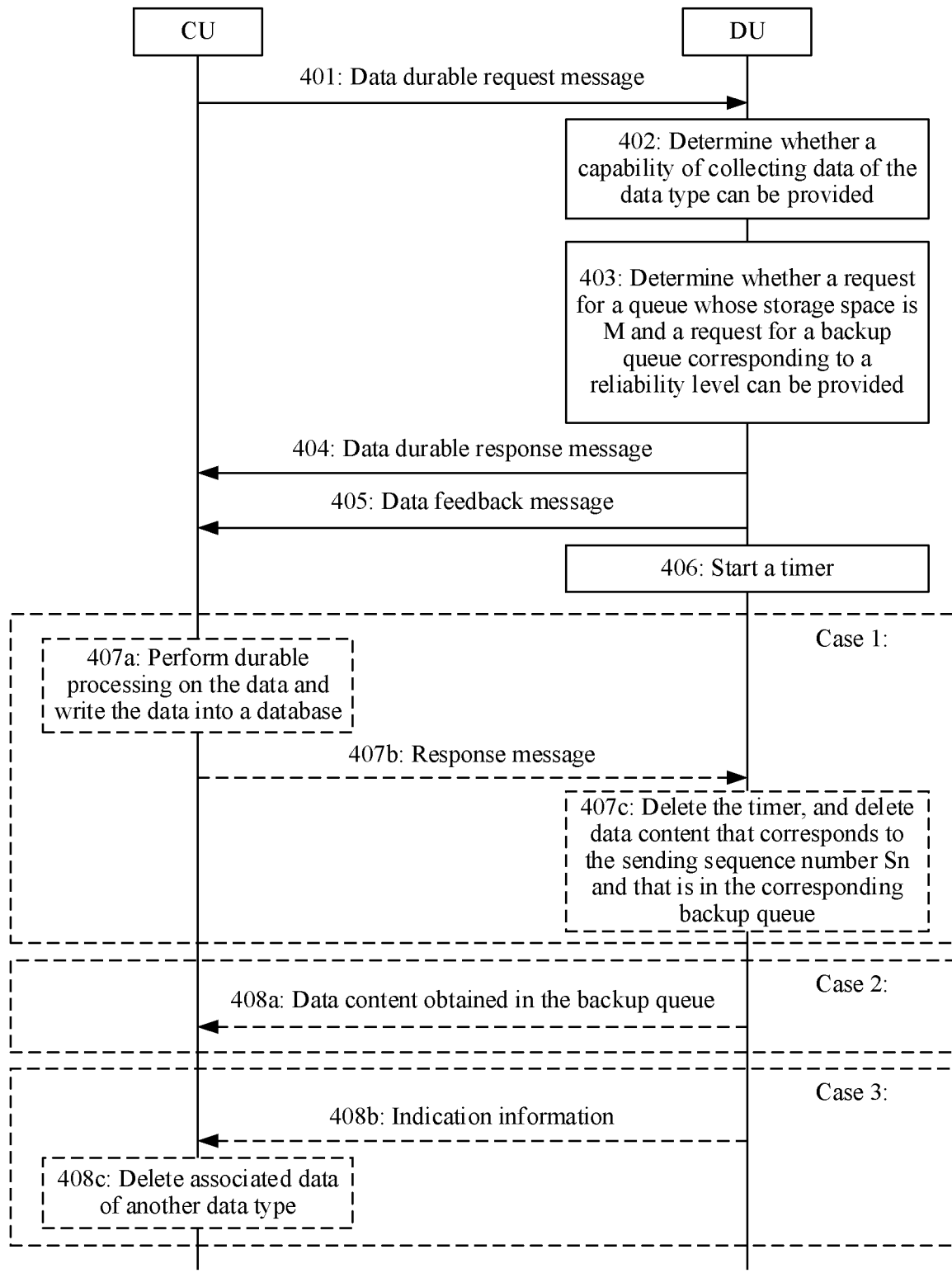
FIG. 4b is a schematic flowchart of a communication method according to this application.

As shown in FIG. 4a, this application provides another communication method. The method includes the following steps.

Step 301: A CU initiates a data durable request message to a DU, where the message carries a to-be-collected data type T and storage space M of a buffer queue requested for the data type T.

Optionally, the message may further carry one or more of the following information: an identifier of the DU and a frequency periodicity Ti for collecting data by the DU.

There may be a plurality of values of T, M, or Ti in the message. In other words, a plurality of data types are requested to be collected at the same time, and values of M or Ti that correspond to different data types may be different.

Step 302: The DU determines, based on the data type carried in the data durable request message, whether a capability of collecting data of the data type can be provided.

Step 303: If the DU can provide the capability of collecting the data of the data type, the DU determines, based on the storage space M of the buffer queue requested for the data type T, whether a request for the buffer queue whose storage space is M can be provided.

If the request cannot be provided, maximum feasible storage space N of the buffer queue needs to be calculated. Therefore, N is less than or equal to M.

Based on the step, for each data type in the data durable request message, storage space that is of a buffer queue and that can be actually constructed may be requested, an identifier (ID) of the buffer queue may be instantiated, and the buffer queue may be created.

Step 304: The DU sends a data durable response message to the CU, where the message carries actual storage space N of a buffer queue corresponding to each data type and a corresponding identifier of the buffer queue.

Optionally, during data buffering performed by the DU, if a free storage resource (that is, space of free storage) of the DU changes, a size of N may also be dynamically adjusted, and an adjusted size of N may be fed back to the CU.

Step 305: After the DU creates the buffer queue, and after the buffer queue is full of buffers (that is, the queue is full), the DU sends a data feedback message to the CU, where the data feedback message carries buffered collection data, the data type T, the corresponding identifier of the buffer queue, a buffered data set, a quantity of data sets, a sending sequence number Sn and a timestamp Ts of data of the data type.

Step 306: After receiving a report of the foregoing data, the CU performs durable processing on the data based on the data type and the identifier of the buffer queue, and writes the data into a database.

When collecting data of a plurality of types at the same time and writing the data into the database, the CU may associate the data of the plurality of types based on the timestamp Ts and the sending sequence number Sn that are uploaded in the data durable response message.

In addition, after data of a type is lost due to a reason in a process of sending data to the CU, the DU may delete, based on the timestamp Ts and the sending sequence number Sn that are uploaded in the data durable response message, another type of data associated with the lost data, to ensure consistency of the data of the plurality of types.

Step 307: After a service is completed, the CU may initiate a data durable cancellation request message to the DU, where the message may carry an identifier of a to-be-canceled buffer queue.

Optionally, the message may further carry the data type T.

The message may carry one or more identifiers of one or more to-be-canceled buffer queues.

Step 308: After receiving the data durable cancel request message, the DU releases storage space of a buffer queue that requests to be canceled, and does not execute a data collection task corresponding to the buffer queue.

Step 309: The DU feeds back released storage space to the CU.

The CU may calculate currently free storage resources of the DU by using the storage space, so as to serve a data durable request initiated by the CU in next time.

Based on this solution, in an architecture in which the CU and the DU are split, product implementation of the DU is resource-limited, and resource-limited data collection cannot be completed in a conventional manner of locally storing a large amount of data. Therefore, a more flexible and lightweight data durable mechanism is required. In this embodiment, in a manner in which a DU buffer queue is constructed, based on an actual free status of a resource, a size of data set space that can be buffered is negotiated between the DU and the CU, and may be dynamically adjusted based on a resource change. After one or more types of data durable tasks are completed, a collection task can be closed in time, to release queue space. By dynamically buffering data in a queue, dependence of the DU on local storage resources is reduced.

It should be noted that interaction between the CU and the DU is used as an example in this solution, and all corresponding procedures are also applicable to interaction between an NWDAF network element and a core network element, or interaction between an OSS and the CU. The difference between these different application scenarios lies in that the collected data types may be different. Specifically, a collected data type is related to a service feature of a domain in which the data type is located.

As shown in FIG. 4*b*, this application provides another communication method. The method includes the following steps.

Compared with the embodiment shown in FIG. 4*a*, this embodiment provides assurance of stream data durable reliability. Because a transmission amount of collected data is large, the collected data is usually not transmitted based on a transmission control protocol (TCP). For example, a DU may send the data to a CU in a real-time transport protocol (RTP) over user datagram protocol (UDP) manner. In this process, data may be lost due to a situation such as network congestion. After the data is lost, the CU deletes associated data of another type to ensure consistency between multi-dimensional data. In this embodiment, assurance of data durable reliability can be implemented.

Step 401: The CU initiates a data durable request message to the DU, where the message carries a to-be-collected data type T and storage space M of a buffer queue requested for the data type.

Optionally, the message may further carry one or more of the following information: an identifier of the DU and a frequency periodicity Ti for collecting data by the DU.

There may be a plurality of values of T, M, or Ti in the message. In other words, a plurality of data types are requested to be collected at the same time, and values of M or Ti that correspond to different data types may be different.

In addition to the foregoing information elements, the data durable request message may further carry a data durable quality of service (QoS) identifier. QoS identifiers are classified into two types: one type is Best effort, and the other type is Reliable.

If the QoS identifier carried in the data durable request message is a Best effort type, steps after step 401 are the same as steps after step 301 in FIG. 4*a*. For details, refer to the foregoing descriptions.

If the QoS identifier carried in the data durable request message is a Reliable type, the following step 402 to step 408*c* are performed after step 401. In addition, the data durable request message may further carry a reliability level K and a timer Tr. A higher reliability level indicates a longer period of time for which data in a backup queue on the DU is buffered.

For a subsequent implementation method in which the QoS identifier carried in the data durable request message is a Best effort type, refer to the embodiment in FIG. 4a. The following describes a case in which the QoS identifier carried in the data durable request message is a Reliable type.

Step 402: The DU determines, based on the data type carried in the data durable request message, whether a capability of collecting data of the data type can be provided.

Step 403: If the DU can provide the capability of collecting the data of the data type, the DU determines, based on the storage space M and the reliability level of the buffer queue requested for the data type, whether a request for the buffer queue whose storage space is M and a request for the backup queue corresponding to the reliability level can be provided.

If the requests cannot be provided, maximum feasible storage space N of the buffer queue needs to be calculated. Therefore, N is less than or equal to M. In addition, maximum feasible storage space P of the backup queue needs to be calculated.

Based on the step, for each data type in the data durable request message, storage space that is of a buffer queue and that can be actually constructed may be requested, an identifier (ID) of the buffer queue may be instantiated, and an identifier of a backup queue corresponding to the buffer queue may be instantiated. That is, the buffer queue and the backup queue are created.

It should be noted that the DU may further adjust, based on space of currently free storage, a reliability level sent by the CU, and allocate storage space of the backup queue based on the reliability level.

Step 404: The DU sends a data durable response message to the CU, where the message carries actual storage space N of a buffer queue corresponding to each data type, a corresponding identifier of the buffer queue, an identifier of the backup queue corresponding to the buffer queue, and storage space P of the backup queue.

Optionally, during data buffering performed by the DU, if a free storage resource of the DU changes, sizes of N and P may also be dynamically adjusted, and adjusted sizes of N and P may be fed back to the CU.

Step 405: After the DU creates the buffer queue, and after the buffer queue is full of buffers (that is, the queue is full), the DU sends a data feedback message to the CU, where the data feedback message carries buffered collection data, a data type T, a corresponding identifier of the buffer queue, a buffered data set, a quantity of data sets, a sending sequence number Sn and a timestamp Ts of data of the data type.

Step 406: The DU starts a timer.

After step 406, in a case, if the CU receives and obtains data in the data feedback message, the following step 407a to step 407c are performed. In another case, if the CU does not obtain the data in the data feedback message, the following step 408a is performed, or the following step 408b and step 408c are performed.

Step 407a: After receiving the data feedback message, the CU performs durable processing on the data in the data feedback message based on a data type in the data feedback message and the identifier of the buffer queue, and writes the data into a database.

Step 407b: The CU sends a response message to the DU, where the message carries a sending sequence number Sn of the data and the identifier of the buffer queue, and optionally, may further carry the data type T.

Step 407c: After receiving the response message, the DU deletes the timer, and deletes data content that corresponds to the sending sequence number Sn and that is in the corresponding backup queue.

Step 408a: After the timer on the DU expires, it is determined that the response message sent by the CU for the received data is not received within a predetermined period of time, and the DU obtains, from the backup queue, the data content (that is, the same data content) corresponding to the sending sequence number Sn, and sends the data content to the CU.

It should be noted that if the backup queue does not have the data content corresponding to the sending sequence number Sn, step 408a is not performed, but the following step 408b and step 408c are performed.

Step 408b: The DU sends indication information to the CU, where the indication information is used to indicate that the data content corresponding to the sending sequence number Sn is lost.

Optionally, in step 408b, the DU may further send the data type T, the identifier of the buffer queue, the sending sequence number Sn, and a quantity cnt of pieces of lost data to the CU.

Step 408c: After receiving the indication information, the CU deletes associated data of another data type based on information such as the sending sequence number Sn and the timestamp.

Based on this solution, data durable QoS control is provided to ensure reliability of collecting data of high-priority or important data types, and minimize service loss caused by data loss.

It should be noted that interaction between the CU and the DU is used as an example in this solution, and all corresponding procedures are also applicable to interaction between an NWDAF network element and a core network element, or interaction between an OSS and the CU. The difference between these different application scenarios lies in that the collected data types may be different. Specifically, a collected data type is related to a service feature of a domain in which the data type is located.

The foregoing mainly describes the solutions provided in this application from a perspective of interaction between network elements. It may be understood that to implement the foregoing functions, each network element includes a corresponding hardware structure and/or software module for implementing each function. A person of ordinary skill in the art should easily be aware that, in combination with the examples described in the embodiments disclosed in this specification, units and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
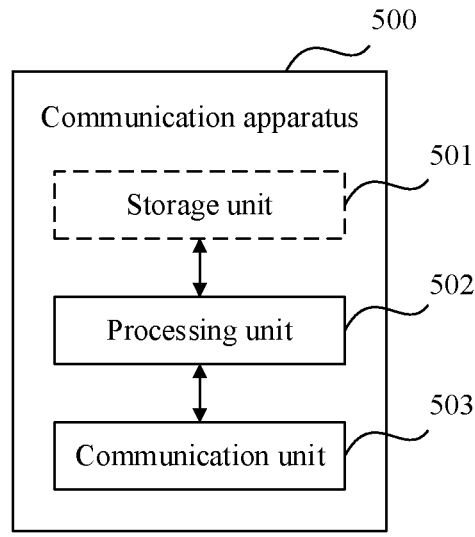
FIG. 5 is a schematic diagram of a communication apparatus according to this application.

FIG. 5 is a block diagram of a possible example of a communication apparatus 500 in this application, and the apparatus 500 may exist in a form of software or hardware. The communication apparatus 500 may include a processing unit 502 and a communication unit 503. In an implementation, the communication unit 503 may include a receiving unit and a sending unit. The processing unit 502 may be configured to control and manage an action of the communication apparatus 500. The communication unit 503 is configured to support the communication apparatus 500 in communicating with another network entity. The communication apparatus 500 may further include a storage unit 501, configured to store program code and data of the communication apparatus 500.

The processing unit 502 may be a processor or a controller, for example, may be a general purpose central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of the DSP and a microprocessor. The storage unit 501 may be a memory. The communication unit 503 is an interface circuit of the apparatus, and is configured to receive a signal from another apparatus. For example, when the apparatus is implemented in a form of a chip, the communication unit 503 is an interface circuit used by the chip to receive a signal from another chip or apparatus, or is an interface circuit used by the chip to send a signal to another chip or apparatus.

The communication apparatus 500 may be the first network element (for example, the DU or the core network element) in any one of the foregoing embodiments, or may be a chip used in the first network element. For example, when the communication apparatus 500 is the first network element, the processing unit 502 may be, for example, a processor, and the communication unit 503 may be, for example, a transceiver. Optionally, the transceiver may include a radio frequency circuit, and the storage unit may be, for example, a memory. For example, when the communication apparatus 500 is the chip used in the first network element, the processing unit 502 may be, for example, a processor, and the communication unit 503 may be, for example, an input/output interface, a pin, or a circuit. The processing unit 502 may execute computer-executable instructions stored in the storage unit. Optionally, the storage unit is a storage unit inside the chip, such as a register or a buffer. Alternatively, the storage unit may be a storage unit that is inside the first network element and that is located outside the chip, such as a read-only memory (ROM), another type of static storage device that can store static information and instructions, or a random access memory (RAM).

In an embodiment, the communication apparatus 500 is a first network element, and the communication unit 503 includes a sending unit and a receiving unit. The receiving unit is configured to receive a request message of a second network element, where the request message includes one or more to-be-collected data types and one or more sizes of one or more requested buffer queues, the one or more data types include a first type, the sizes of the one or more requested buffer queues include a size of a requested first buffer queue, and the first buffer queue corresponds to the first type. The processing unit is configured to determine an actual size of the first buffer queue based on at least one of the sizes of the one or more requested buffer queues, where the actual size of the first buffer queue is less than or equal to the size of the requested first buffer queue.

In a possible implementation method, the processing unit is specifically configured to determine the actual size of the first buffer queue based on space of free storage of the first network element and the at least one of the sizes of the one or more requested buffer queues.

In a possible implementation method, the processing unit is specifically configured to determine the actual size of the first buffer queue based on the size of the requested first buffer queue and the space of free storage of the first network element.

In a possible implementation method, the first network element sends a response message for the request message to the second network element, where the response message includes an identifier of the first buffer queue and the actual size of the first buffer queue.

In a possible implementation method, the processing unit is further configured to: collect data of the first type and buffer the data in the first buffer queue. The sending unit is configured to send a data feedback message to the second network element when the data buffered in the first buffer queue meets a sending condition, where the data feedback message includes the data buffered in the first buffer queue, the first type, and the identifier of the first buffer queue.

In a possible implementation method, the processing unit is further configured to: after the sending unit sends the data feedback message to the second network element, back up the data buffered in the first buffer queue to a first backup queue, and clear the first buffer queue, where the first backup queue is used to back up the data buffered in the first buffer queue.

In a possible implementation method, the processing unit is further configured to: continue to collect data of the first type and buffer the data in the first buffer queue; after the sending unit sends the data buffered in the first buffer queue to the second network element, if the first backup queue is full, delete a part or all of data backed up in the first backup queue; and back up, to the first backup queue, the data buffered in the first buffer queue, and clear the first buffer queue.

In a possible implementation method, the request message further includes a reliability level, and the reliability level is positively correlated with an actual size of the first backup queue.

In a possible implementation method, the processing unit is further configured to: update the reliability level based on the space of free storage of the first network element, and determine the actual size of the first backup queue based on an updated reliability level. The sending unit is further configured to send the updated reliability level to the second network element.

In a possible implementation method, the processing unit is further configured to start a timer after the sending unit sends the data feedback message to the second network element. The sending unit is further configured to send backup data to the second network element when the processing unit determines that a response message sent by the second network element for the data feedback message is not received before the timer expires, and determines that the backup data of the data in the data feedback message is stored in the first backup queue.

In a possible implementation method, the processing unit is further configured to: start a timer after the sending unit sends the data feedback message to the second network element; and stop the timer and delete backup data that is stored in the first backup queue and that is backed up for the data in the data feedback message when determining that a response message sent by the second network element for the data feedback message is received before the timer expires.

In a possible implementation method, the processing unit is further configured to: start a timer after the sending unit sends the data feedback message to the second network element; and stop the timer when determining that a response message sent by the second network element for the data feedback message is not received before the timer expires, and determining that backup data of the data in the data feedback message is not stored in the first backup queue.

In a possible implementation method, the sending unit is further configured to send indication information to the second network element, where the indication information includes the first type, the identifier of the first buffer queue, and a sending sequence number corresponding to the data buffered in the first buffer queue, and the indication information is used to indicate that the data that corresponds to the sending sequence number and that is in the first buffer queue is lost.

In a possible implementation method, the timer is carried in the request message or set by the first network element.

In a possible implementation method, the data feedback message further includes one or more of the following information: a quantity of pieces of data buffered in the first buffer queue, a sending sequence number corresponding to the data buffered in the first buffer queue, and collection time corresponding to the data buffered in the first buffer queue.

In a possible implementation method, that the sending condition is met means that the first buffer queue is full.

In a possible implementation method, the receiving unit is further configured to receive a queue deletion message from the second network element, where the deletion message includes the identifier of the first buffer queue, and the deletion message is used to request to delete the first buffer queue.

In a possible implementation method, the processing unit is further configured to delete the first buffer queue. The sending unit is further configured to send, to the second network element, storage space released after the first buffer queue is deleted.

In a possible implementation method, the processing unit is further configured to determine that the first network element has a capability of collecting data of the first type.

In a possible implementation method, the processing unit is further configured to: determine that the space of free storage of the first network element changes, and adjust the actual size of the first buffer queue based on changed space of free storage of the first network element. The sending unit is further configured to send an adjusted actual size of the first buffer queue to the second network element.

In a possible implementation method, the first network element is a distributed unit, and the second network element is a centralized unit; the first network element is a core network element, and the second network element is a data analysis network element; or the first network element is a distributed unit, and the second network element is an operations support system.

It may be understood that, for a specific implementation process and a corresponding beneficial effect of the communication apparatus when the communication apparatus is used for the communication method, refer to related descriptions in the foregoing method embodiments, and details are not described herein again.

Figure 6:
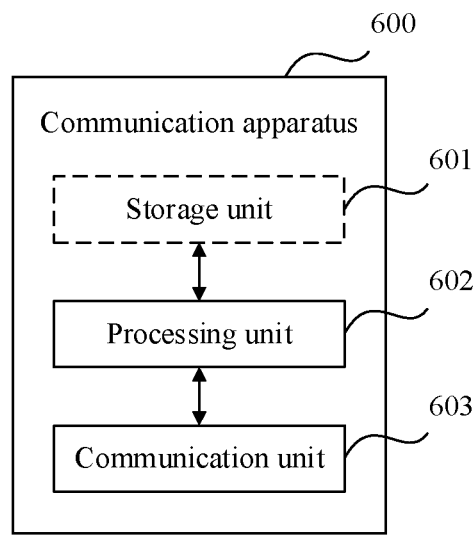
FIG. 6 is a schematic diagram of another communication apparatus according to this application.

FIG. 6 is a block diagram of a possible example of a communication apparatus 600 in this application, and the apparatus 600 may exist in a form of software or hardware. The communication apparatus 600 may include a processing unit 602 and a communication unit 603. In an implementation, the communication unit 603 may include a receiving unit and a sending unit. The processing unit 602 may be configured to control and manage an action of the communication apparatus 600. The communication unit 603 is configured to support the communication apparatus 600 in communicating with another network entity. The communication apparatus 600 may further include a storage unit 601, configured to store program code and data of the communication apparatus 600.

The processing unit 602 may be a processor or a controller, for example, may be a CPU, a general purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of the DSP and a microprocessor. The storage unit 601 may be a memory. The communication unit 603 is an interface circuit of the apparatus, and is configured to receive a signal from another apparatus. For example, when the apparatus is implemented in a form of a chip, the communication unit 603 is an interface circuit used by the chip to receive a signal from another chip or apparatus, or is an interface circuit used by the chip to send a signal to another chip or apparatus.

The communication apparatus 600 may be the second network element (for example, the NWDAF network element, the CU, or the OSS) in any one of the foregoing embodiments, or may be a chip used in the second network element. For example, when the communication apparatus 600 is the second network element, the processing unit 602 may be, for example, a processor, and the communication unit 603 may be, for example, a transceiver. Optionally, the transceiver may include a radio frequency circuit, and the storage unit may be, for example, a memory. For example, when the communication apparatus 600 is the chip used in the second network element, the processing unit 602 may be, for example, a processor, and the communication unit 603 may be, for example, an input/output interface, a pin, or a circuit. The processing unit 602 may execute computer-executable instructions stored in the storage unit. Optionally, the storage unit is a storage unit inside the chip, such as a register or a buffer. Alternatively, the storage unit may be a storage unit that is inside the second network element and that is located outside the chip, such as a ROM, another type of static storage device that can store static information and instructions, or a RAM.

In an embodiment, the communication apparatus 600 is a second network element, and the communication unit 603 includes a sending unit and a receiving unit. The sending unit is configured to send a request message to a first network element, where the request message includes one or more to-be-collected data types and one or more sizes of one or more requested buffer queues, the one or more data types include a first type, the sizes of the one or more requested buffer queues include a size of a requested first buffer queue, and the first buffer queue corresponds to the first type. The receiving unit is configured to receive a response message sent by the first network element for the request message, where the response message includes an identifier of the first buffer queue and an actual size of the first buffer queue, the actual size of the first buffer queue is determined based on at least one of the sizes of the one or more requested buffer queues, and the actual size of the first queue is less than or equal to the size of the requested first buffer queue.

In a possible implementation method, the receiving unit is further configured to receive a data feedback message from the first network element, where the data feedback message includes data buffered in the first buffer queue, the first type, and the identifier of the first buffer queue.

In a possible implementation method, the request message further includes a reliability level, and the reliability level is positively correlated with an actual size of the first backup queue.

In a possible implementation method, the receiving unit is further configured to receive an updated reliability level from the first network element.

In a possible implementation method, the receiving unit is further configured to receive backup data in the first backup queue from the first network element.

In a possible implementation method, the request message further includes a timer, and the timer is configured to determine time for sending the backup data in the first backup queue.

In a possible implementation method, the receiving unit is further configured to receive indication information from the first network element, where the indication information includes the first type, the identifier of the first buffer queue, and a sending sequence number corresponding to the data buffered in the first buffer queue, and the indication information is used to indicate that the data that corresponds to the sending sequence number and that is in the first buffer queue is lost.

In a possible implementation method, the processing unit is configured to delete the data that corresponds to the sending sequence number and that is in data of another type associated with the first type.

In a possible implementation method, the data feedback message further includes one or more of the following information: a quantity of pieces of data buffered in the first buffer queue, a sending sequence number corresponding to the data buffered in the first buffer queue, and collection time corresponding to the data buffered in the first buffer queue.

In a possible implementation method, the sending unit is further configured to send a queue deletion message to the first network element, where the deletion message includes the identifier of first buffer queue, and the deletion message is used to request to delete the first buffer queue.

In a possible implementation method, the receiving unit is further configured to receive, from the first network element, storage space released after the first buffer queue is deleted.

In a possible implementation method, the first network element is a distributed unit, and the second network element is a centralized unit; the first network element is a core network element, and the second network element is a data analysis network element; or the first network element is a distributed unit, and the second network element is an operations support system.

It may be understood that, for a specific implementation process and a corresponding beneficial effect of the communication apparatus when the communication apparatus is used for the communication method, refer to related descriptions in the foregoing method embodiments, and details are not described herein again.

Figure 7:
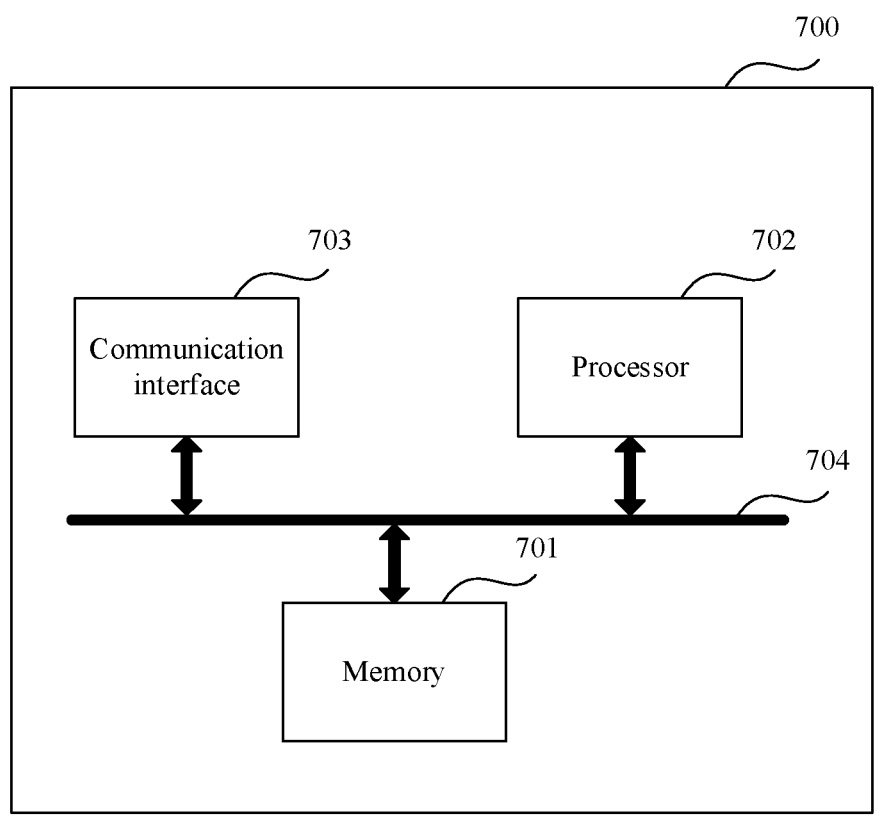
FIG. 7 is a schematic diagram of another communication apparatus according to this application.

FIG. 7 is a schematic diagram of a communication apparatus 700 according to this application. The communication apparatus may be the first network element or the second network element. The communication apparatus 700 includes a processor 702, a communication interface 703, and a memory 701. Optionally, the communication apparatus 700 may further include a communication line 704. The communication interface 703, the processor 702, and the memory 701 may be connected to each other through a communication line 704. The communication line 704 may be a peripheral component interconnect (PCI for short) bus, an extended industry standard architecture (EISA for short) bus, or the like. The communication line 704 may be classified into an address bus, a data bus, a control bus, and the like. For ease of representation, only one thick line is used to represent the bus in FIG. 7, but this does not mean that there is only one bus or only one type of bus.

The processor 702 may be a CPU, a microprocessor, an ASIC, or one or more integrated circuits configured to control program execution in the solutions of this application.

The communication interface 703 may be any apparatus like a transceiver, and is configured to communicate with another device or a communication network, such as Ethernet, a RAN, a wireless local area network (WLAN), or a wired access network.

The memory 701 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 704. The memory may alternatively be integrated with the processor.

The memory 701 is configured to store computer-executable instructions for executing the solutions in this application, and the processor 702 controls the execution. The processor 702 is configured to execute the computer-executable instructions stored in the memory 701, to implement the communication method provided in the foregoing embodiments of this application.

Optionally, the computer-executable instructions in this embodiment of this application may also be referred to as application program code. This is not specifically limited in this embodiment of this application.

A person of ordinary skill in the art may understand that first, second, and various reference numerals in this application are merely distinguished for convenient description, and are not used to limit a scope of the embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. At least two means two or more. "At least one", "any one", or a similar expression thereof means any combination of the items, including a singular item (piece) or any combination of plural items (pieces). For example, at least one (piece, or type) of a, b, or c may indicate: a, b, c, a and b, a and c, b and c, or a, b, and c, where a, b, and c may be singular or plural. The term "a plurality of" indicates two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may further be integrated into the processor. The processor and the storage medium may be disposed in an ASIC.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In one or more examples of designs, the functions described in this application may be implemented by using hardware, software, firmware, or any combination thereof. If the functions are implemented by software, the functions may be stored in a computer-readable medium or are transmitted to the computer-readable medium in a form of one or more instructions or code. The computer-readable medium includes a computer storage medium or a communication medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, or a digital subscriber line (DSL), or in a wireless manner such as an infrared manner, a radio manner, or a microwave manner, the software is also included in the defined computer-readable medium. The disk and the disc include a compact disc, a laser disc, an optical disc, a digital versatile disc (DVD for short), a floppy disk, and a Blu-ray disc. The disk usually copies data by a magnetic means, and the disc optically copies data by a laser means. The foregoing combination may also be included in the computer-readable medium.

A person of skill in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the embodiments and designs but may also be extended to a maximum scope that is consistent with the principles and disclosed new features of this application.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
receiving, by a first network element, a request message of a second network element, wherein the request message comprises one or more to-be-collected data types and one or more sizes of one or more requested buffer queues, the one or more data types comprise a first type, the sizes of the one or more requested buffer queues comprise a size of a requested first buffer queue, and the first buffer queue corresponds to the first type;
determining, by the first network element, an actual size of the first buffer queue based on at least one of the sizes of the one or more requested buffer queues, wherein the actual size of the first buffer queue is less than or equal to the size of the first buffer queue;
sending, by the first network element, a data feedback message to the second network element when data buffered in the first buffer queue meets a sending condition, wherein the data feedback message comprises the data buffered in the first buffer queue, the first type, and the identifier of the first buffer queue; and
backing up, by the first network element, the data buffered in the first buffer queue to a first backup queue, and clearing the first buffer queue, wherein the first backup queue is used to back up the data buffered in the first buffer queue;
wherein after the sending, by the first network element, a data feedback message to the second network element, the method further comprises:
starting, by the first network element, a timer; and
stopping, by the first network element, the timer when it is determined that a response message sent by the second network element for the data feedback message is not received before the timer expires and that backup data of the data in the data feedback message is not stored in the first backup queue.

2. The method according to claim 1, wherein the determining, by the first network element, an actual size of the first buffer queue based on at least one of the sizes of the one or more requested buffer queues comprises:
determining, by the first network element, the actual size of the first buffer queue based on a free storage space of the first network element and the at least one of the sizes of the one or more requested buffer queues.

3. The method according to claim 1, further comprising:
sending, by the first network element, a response message in response to the request message to the second network element, wherein the response message comprises an identifier of the first buffer queue and the actual size of the first buffer queue.

4. The method according to claim 1, wherein after starting, by the first network element, a timer, the method further comprises;
sending, by the first network element, backup data to the second network element when it is determined that a response message sent by the second network element for the data feedback message is not received before the timer expires and that the backup data of the data in the data feedback message is stored in the first backup queue.

5. The method according to claim 4, wherein the timer is carried in the request message or set by the first network element.

6. The method according to claim 1, wherein after starting, by the first network element, a timer, the method further comprises;
stopping, by the first network element, the timer and deleting backup data that is stored in the first backup queue and that is backed up for the data in the data feedback message when it is determined that a response message sent by the second network element for the data feedback message is received before the timer expires.

7. The method according to claim 1, further comprising:
sending, by the first network element, indication information to the second network element, wherein the indication information comprises the first type, the identifier of the first buffer queue, and a sending sequence number corresponding to the data buffered in the first buffer queue, and the indication information is used to indicate that data that corresponds to the sending sequence number and that is in the first buffer queue is lost.

8. The method according to claim 1, further comprising:
receiving, by the first network element, a queue deletion message from the second network element, wherein the deletion message comprises the identifier of the first buffer queue, and the deletion message is used to request to delete the first buffer queue; and
sending, by the first network element to the second network element, storage space capacity that has been released after the first buffer queue is deleted.

9. A communication apparatus, comprising:
at least one processor; and
a memory coupled to the at least one processor and storing executable instructions for execution by the at least one processor, the executable instructions instruct the at least one processor to:
receive a request message of a second network element, wherein the request message comprises one or more to-be-collected data types and one or more sizes of one or more requested buffer queues, the one or more data types comprise a first type, the sizes of the one or more requested buffer queues comprise a size of a requested first buffer queue, and the first buffer queue corresponds to the first type; and
determine an actual size of the first buffer queue based on at least one of the sizes of the one or more requested buffer queues, wherein the actual size of the first buffer queue is less than or equal to the size of the requested first buffer queue;

send, by the first network element, a data feedback message to the second network element when data buffered in the first buffer queue meets a sending condition, wherein the data feedback message comprises the data buffered in the first buffer queue, the first type, and the identifier of the first buffer queue; and back up, by the first network element, the data buffered in the first buffer queue to a first backup queue, and clearing the first buffer queue, wherein the first backup queue is used to back up the data buffered in the first buffer queue;

wherein after the sending, by the first network element, a data feedback message to the second network element, the executable instructions further instruct the at least one processor to:

start, by the first network element, a timer; and stop, by the first network element, the timer when it is determined that a response message sent by the second network element for the data feedback message is not received before the timer expires and that backup data of the data in the data feedback message is not stored in the first backup queue.

10. The apparatus according to claim 9, wherein the executable instructions instruct the at least one processor to: determine the actual size of the first buffer queue based on free storage space of the apparatus and the at least one of the sizes of the one or more requested buffer queues.

11. The apparatus according to claim 9, wherein the executable instructions instruct the at least one processor to:

send a response message in response to the request message to the second network element, wherein the response message comprises an identifier of the first buffer queue and the actual size of the first buffer queue.

12. The apparatus according to claim 9, wherein the sending unit is further configured to send backup data to the second network element when the at least one processor determines that a response message sent by the second network element for the data feedback message is not received before the timer expires, and determines that the backup data of the data in the data feedback message is stored in the first backup queue.

13. The apparatus according to claim 9, wherein the executable instructions instruct the at least one processor to:

stop the timer and delete backup data that is stored in the first backup queue and that is backed up for the data in the data feedback message when it is determined that a response message sent by the second network element for the data feedback message is received before the timer expires.

\* \* \* \* \*

UNITED STATES PATENT AND TRADEMARK OFFICE
CERTIFICATE OF CORRECTION

| | | |
|---|---|---|
| PATENT NO. | : 11,963,034 B2 | Page 1 of 1 |
| APPLICATION NO. | : 17/477608 | |
| DATED | : April 16, 2024 | |
| INVENTOR(S) | : Yixu Xu et al. | |

It is certified that error appears in the above-identified patent and that said Letters Patent is hereby corrected as shown below:

In the Claims

In Column 33, Line 50, in Claim 1, delete "back up" and insert -- backup --.

In Column 35, Line 10, in Claim 9, delete "back up," and insert -- backup, --.

In Column 35, Line 13, in Claim 9, delete "back up" and insert -- backup --.

Signed and Sealed this
Eleventh Day of June, 2024

Katherine Kelly Vidal
*Director of the United States Patent and Trademark Office*